United States Patent [19]

Iima et al.

[11] Patent Number: 5,646,767
[45] Date of Patent: Jul. 8, 1997

[54] SCANNING OPTICAL SYSTEM

[75] Inventors: Mitsunori Iima; Takashi Iizuka, both of Tokyo, Japan

[73] Assignee: Asahi Kogaku Kogyo Kabushiki Kaisha, Tokyo, Japan

[21] Appl. No.: 361,954

[22] Filed: Dec. 22, 1994

[30] Foreign Application Priority Data

Dec. 22, 1993 [JP] Japan ................................ 5-325353
Apr. 19, 1994 [JP] Japan ................................ 6-080744
Sep. 21, 1994 [JP] Japan ................................ 6-226563

[51] Int. Cl.$^6$ .................................................. G02B 26/08
[52] U.S. Cl. ........................ 359/206; 359/216; 347/258
[58] Field of Search ............................... 359/196, 197, 359/198, 216, 217, 218, 219, 220, 206; 250/235, 236; 346/108, 160; 347/256, 258

[56] References Cited

U.S. PATENT DOCUMENTS

| | | | |
|---|---|---|---|
| 4,712,884 | 12/1987 | Sakuma et al. | 359/218 |
| 4,993,792 | 2/1991 | Minoura | 359/206 |
| 4,998,790 | 3/1991 | Iizuka et al. | 359/207 |
| 5,051,757 | 9/1991 | Hasegawa | 346/108 |
| 5,093,745 | 3/1992 | Kuroda | 359/217 |
| 5,142,404 | 8/1992 | Shiraishi et al. | 359/217 |
| 5,153,608 | 10/1992 | Genovese | 346/108 |
| 5,221,986 | 6/1993 | Itabashi | 359/206 |
| 5,255,112 | 10/1993 | Hori et at. | 359/196 |
| 5,402,258 | 3/1995 | Murakami et al. | 359/205 |
| 5,557,446 | 9/1996 | Kato | 359/206 |

FOREIGN PATENT DOCUMENTS

| | | | |
|---|---|---|---|
| 61-95314 | 9/1986 | Japan | G02B 26/10 |
| 63-174316 | 11/1988 | Japan | G02B 26/10 |
| 5346553 | 12/1993 | Japan | G02B 26/10 |

*Primary Examiner*—Paul M. Dzierzynski
*Assistant Examiner*—John Juba, Jr.
*Attorney, Agent, or Firm*—Greenblum & Bernstein, P.L.C.

[57] ABSTRACT

A scanning optical system with a light beam deflected by an optical deflector is scanned on a scanning surface in a main scanning direction through the scanning optical system. The scanning optical system comprises an image forming lens system having a refracting power at least in a direction of the main scanning direction and an optical member having at least one deviated surface whose center of radius of paraxial curvature is deviated from a main scanning plane in a sub-scanning direction which is normal to the main scanning direction. The main scanning plane is defined by a plane that the light beam scans. A light interrupting member for interrupting a ghosting light reflected by external or internal surfaces including the deviated surface in the image forming lens system is provided. The light interrupting member is disposed between the image forming lens system and the scanning surface to prevent ghosting light from reaching to the scanning surface.

35 Claims, 26 Drawing Sheets

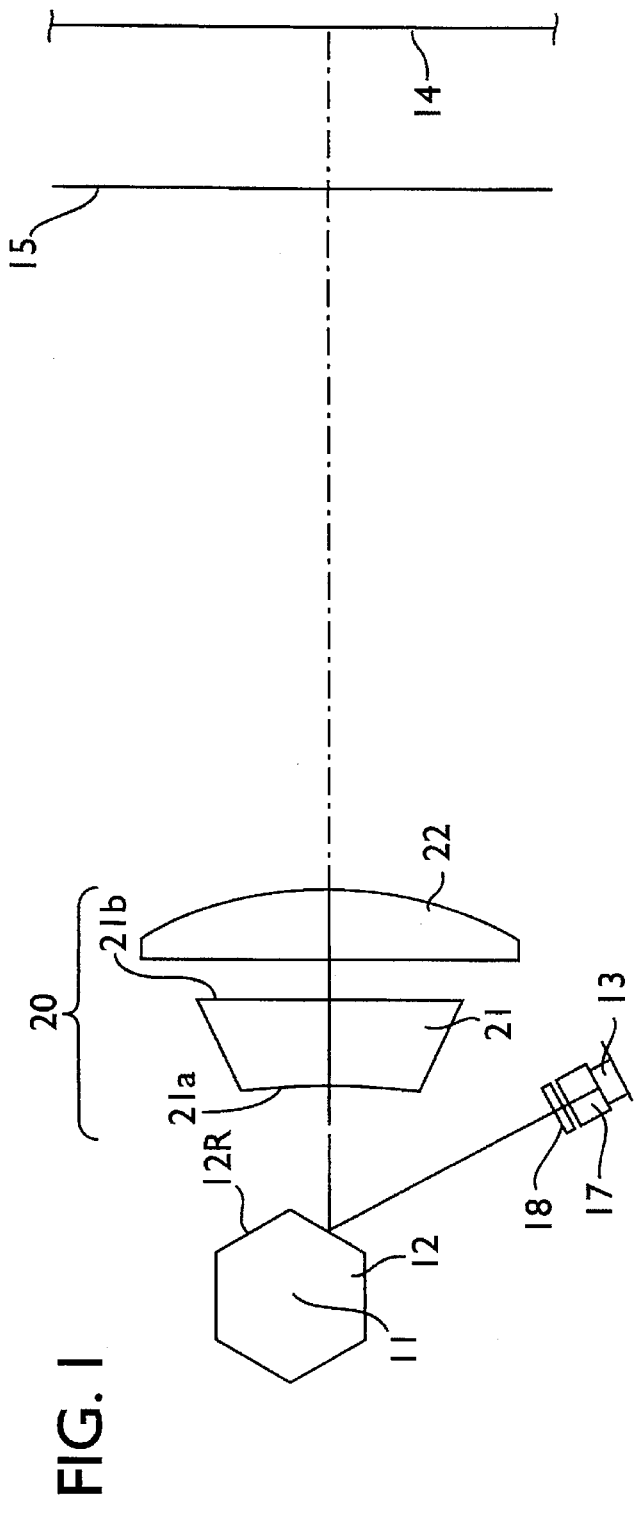
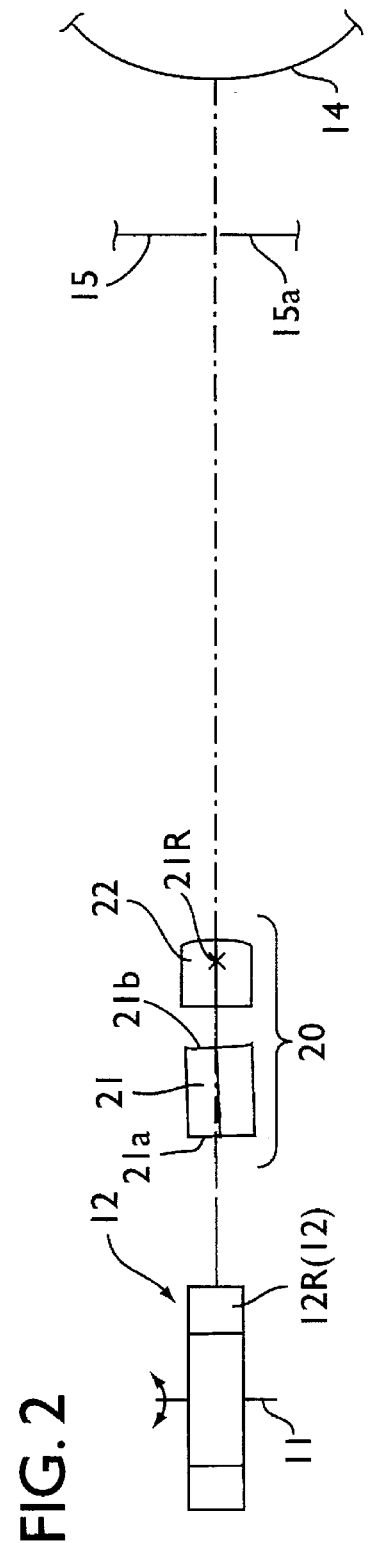
FIG. 1
FIG. 2

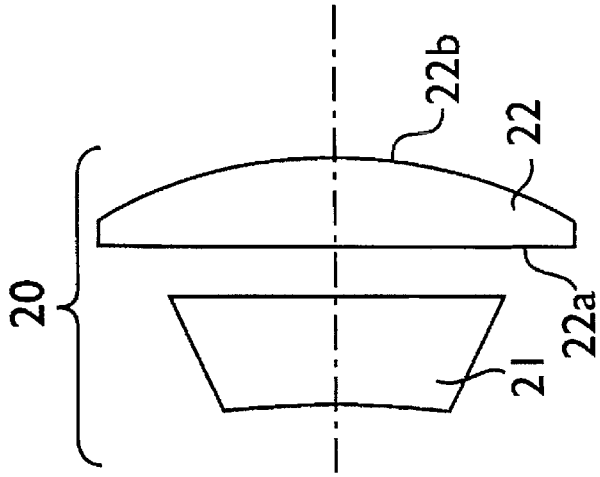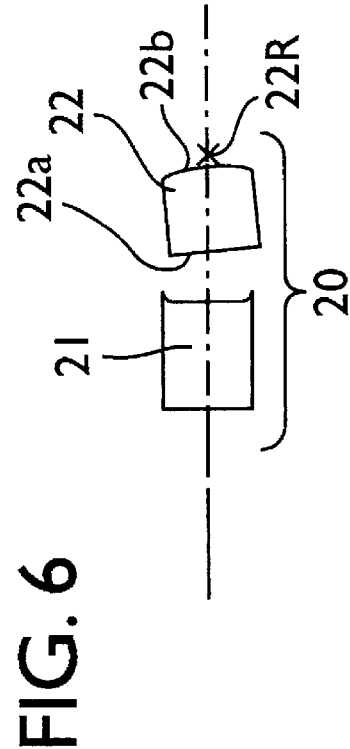
FIG. 5
FIG. 6

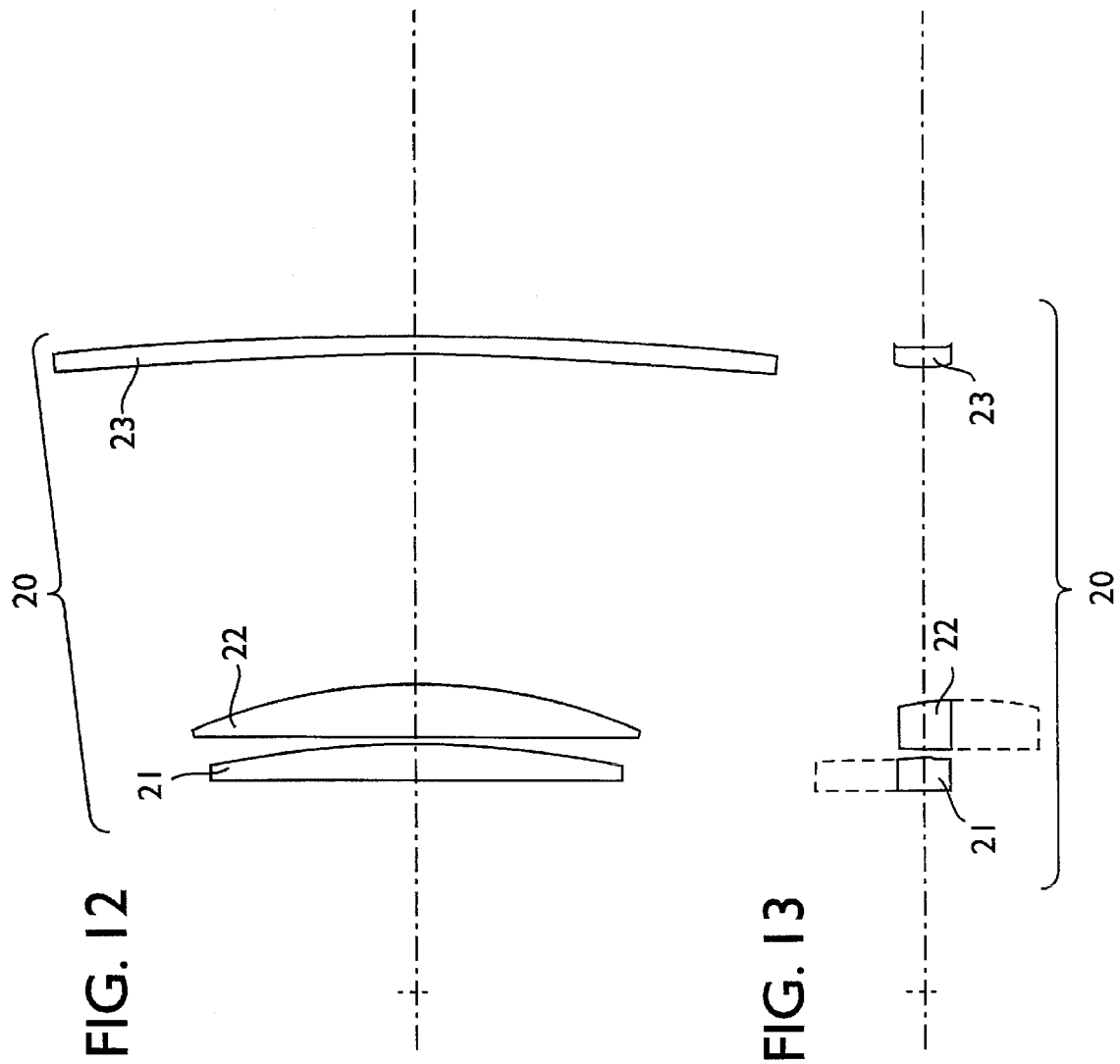

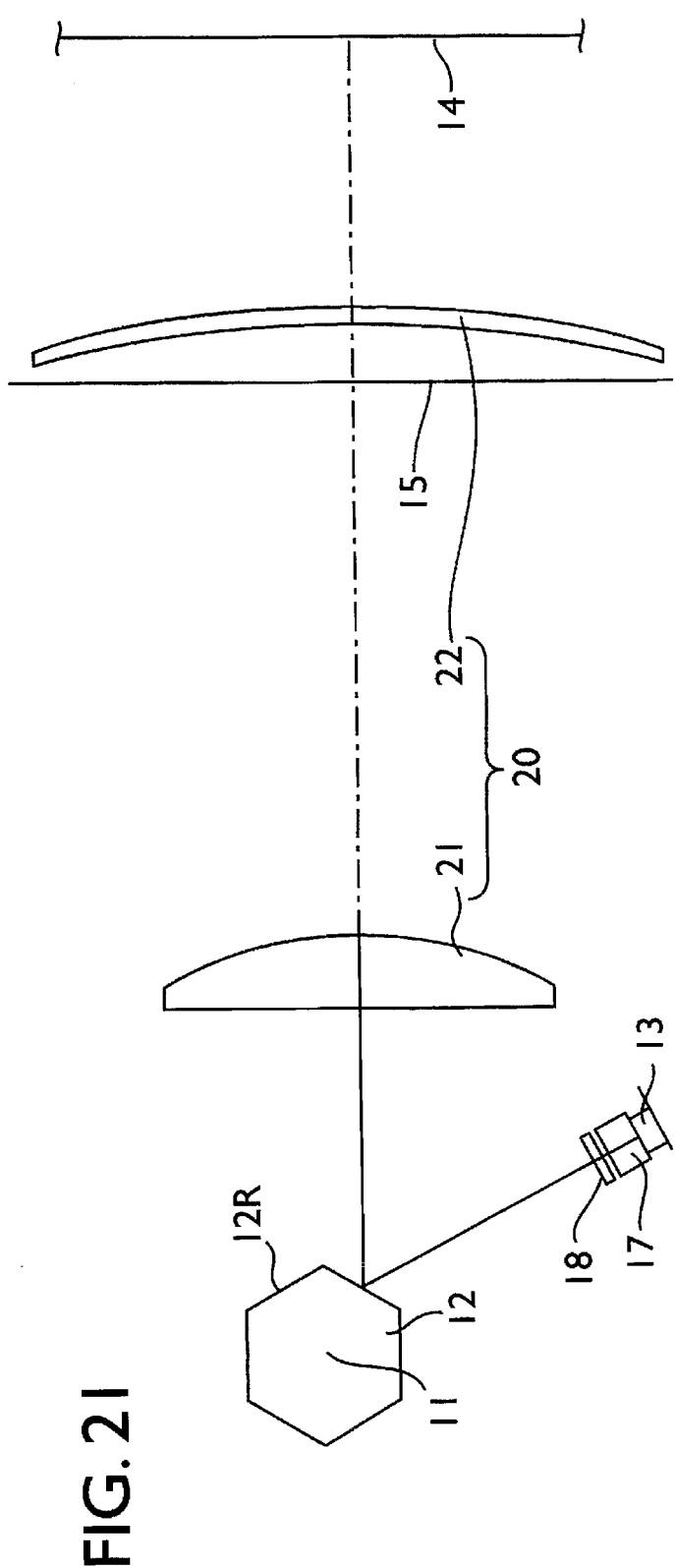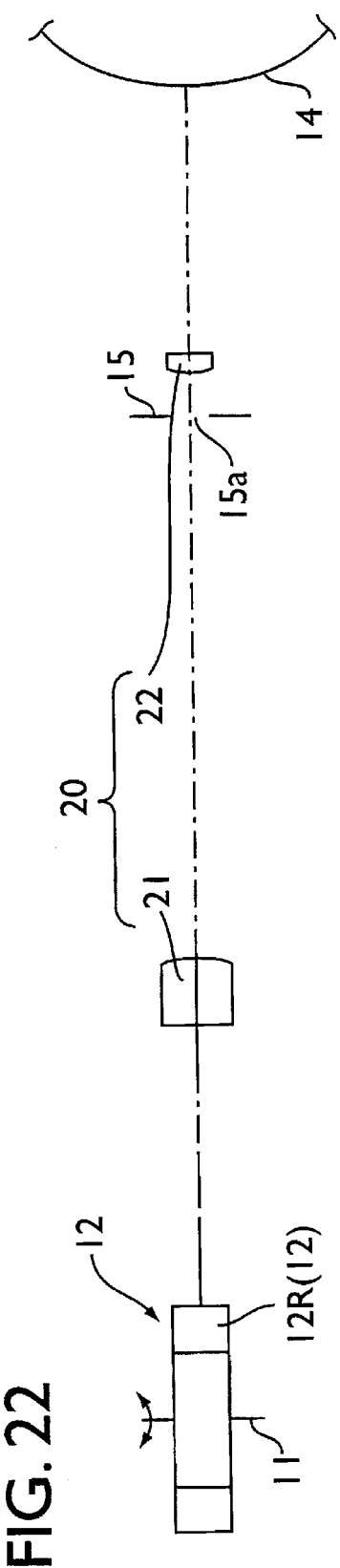
FIG. 21
FIG. 22

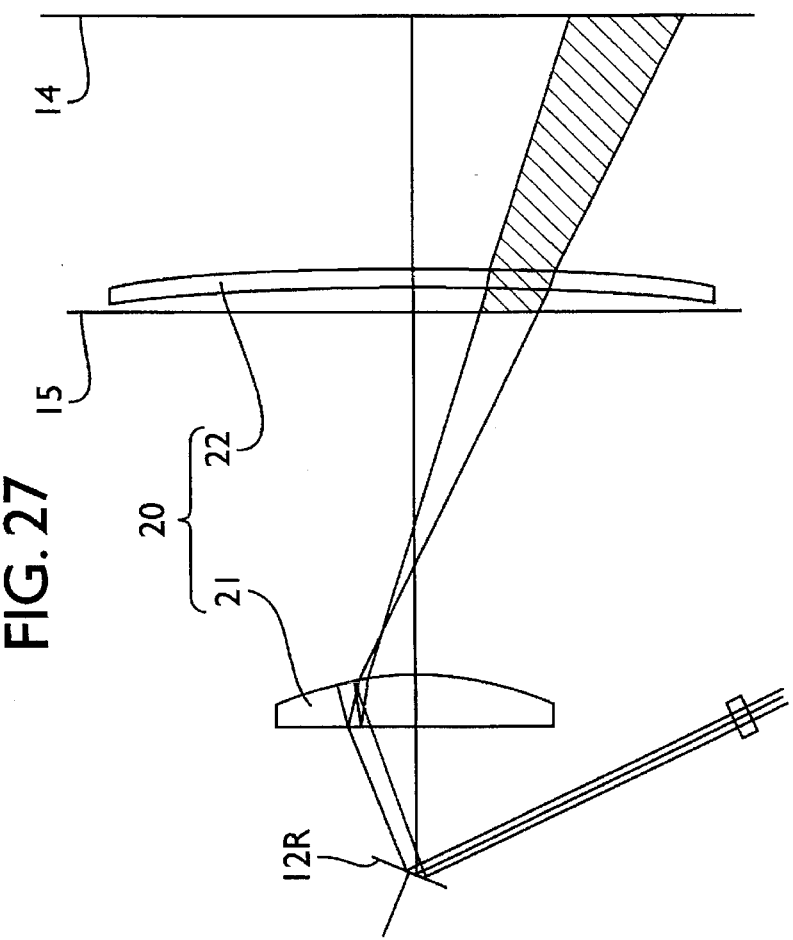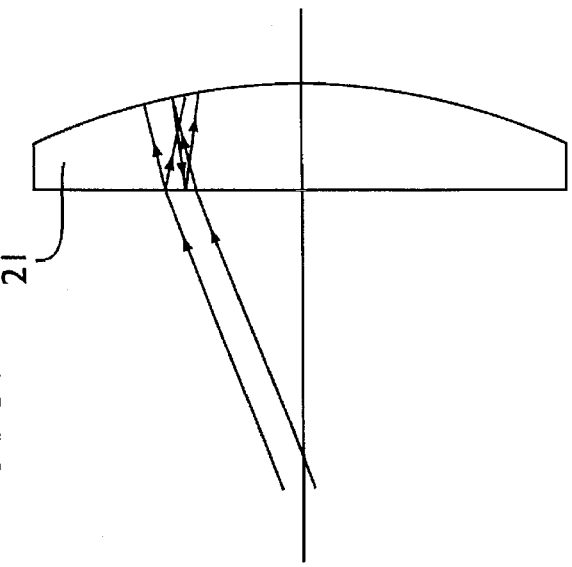

SCANNING OPTICAL SYSTEM

BACKGROUND OF THE INVENTION

1. Field of the Invention

The present invention relates to a scanning optical system, and more particularly to a scanning optical system for preventing ghosting caused by light reflected on surfaces of lenses in the system.

2. Description of the Related Art

A scanning optical system is essential to a laser printer, a laser scanner, a bar code reader and the like. An optical deflector such as a polygonal mirror, a hologram disk or the like is used for the system. A laser beam emitted from a semiconductor laser hits the light deflector and is scanned. The scanned light beam is further scanned on a scanning surface through the use of a scanning lens group. The scanning surface is a drum having a surface made of a photosensitive material in the case where the optical scanning system is applied to a laser printer.

Conventionally, glass has been used as the material for the scanning lenses of the scanning optical system, and an anti-reflection coating has been applied to the surface thereof. In recent years, however, the scanning lenses also have been made of synthetic resins to reduce production costs, and the anti-reflection coating has not been applied due to technical and economical reasons. Glass lenses with an anti-reflection coating have no reflection problems with a laser beam. But, plastic lenses without anti-reflection coating are one of the factors having a detrimental influence on the quality of pictures since ghosting caused by reflections between surfaces more frequently occurs with plastic lenses. The ghosting makes an image on the scanned surface unclear, for example, printed letters become unclear in laser beam printers. Moreover, the sensitivity of the photosensitive drum has been improved recently to indicate half tone images. Therefore, a reduction in the quality of images due to ghosting is not negligible.

SUMMARY OF THE INVENTION

An object of the present invention is to provide a scanning optical system without anti-reflection coating in which the generation of ghosting is eliminated or mitigated. In particular, the object of the present invention is to provide a scanning optical system in which ghosting caused by the light reflected on surfaces of a lens is effectively prevented from reaching the scanning surface.

Another object of the present invention is to provide a scanning optical system in which "bowing" is restricted. "Bowing" is a phenomenon where a light beam actually scanned on a scanning surface is bent like a bow. Generally, the magnification of the bow is indicated by a difference between a mean value of the shifts of both ends of the scanned light from an ideal (standard) scanning line along a main scanning direction on the scanning surface, and a shift of the center of the scanned light from the ideal scanning line.

The present invention has been made in the following steps.

Ghosting is caused by the reflection of a laser beam on surfaces of a lens or lenses. Therefore, the ghosting is avoidable if the reflected light does not reach a scanning surface onto which the light beam scanned by an optical deflector reaches. In the present invention, a center of (paraxial) curvature of one surface of a lens in the scanning lens system, particularly of one surface of the lens primarily causing the ghosting is deviated from a main scanning plane in a sub-scanning direction which is normal to the main scanning direction, the main scanning plane being defined by a plane in which the light beam is being scanned. For the purpose of simplicity, a lens having one surface whose center of (paraxial) curvature is deviated from the main scanning plane is referred to as the "deviated lens" hereinafter.

The existence of the deviated lens in the scanning lens system prevents light reflected on the surface, if any, from reaching the scanning surface. In other words, the problem with ghosting can be eliminated. However, when the deviated lens is present in the optical scanning lens system, then the problem with "bowing" arises. Namely, in the scanning lens system having no deviated lens, light scanned by the system is linearly scanned on the scanning surface in the main scanning plane. However, when the optical scanning system includes a deviated lens, a scanned laser beam is scanned while being slightly shifted in the sub-scanning direction from the main scanning plane. In general, the amount of the beam shift in the sub-scanning direction is different at the center in comparison with the ends of the scanning line, so that the scanning line forms the shape of a bow. Therefore, the shift in the sub-scanning direction is referred to as "bowing". Significant bowing causes, for instance in laser printers, printed letters which are arranged in a line to bend into a curve. Relatively small amounts of bowing have negligible effect, however in some optical systems, significant bowing may be generated when ghosting is prevented from reaching the scanning surface.

In the present invention, not only one surface of a lens in the scanning optical system is shifted to eliminate the detrimental influence of the ghosting but also another surface of a lens in the system is shifted to mitigate the bowing.

According to the present invention, there is provided a scanning optical system wherein a light beam deflected by an optical deflector is scanned on a scanning surface in a main scanning direction through said scanning optical system, comprising: an image forming lens system having a refracting power at least in a direction of said main scanning direction; an optical member having at least one deviated surface whose center of radius of paraxial curvature is deviated from a main scanning plane, the main scanning plane being defined by a plane in which the light beam is being scanned, said optical member having the deviated surface being a part of said image forming lens system; and a light interrupting member for interrupting a ghosting light reflected by external or internal surfaces including said deviated surface in said image forming lens system, said light interrupting member being disposed between said image forming lens system and said scanning surface to prevent said ghosting light from reaching to said scanning surface.

According to another aspect of the present invention, there is provided a scanning optical system wherein a light beam deflected by an optical deflector is scanned on a scanning surface in a main scanning direction through said scanning optical system, comprising: one image forming lens and one correction lens for correcting a deviation of laser beam from the main scanning plane which is caused by a tilt of a surface of said light deflector, said image forming lens being shifted in a sub-scanning direction which is normal to said main scanning direction; and a light interrupting member disposed between said image forming lens and said correction lens so as to prevent light reflected by a surface of said image forming lens system from reaching said scanning surface.

According to further aspect of the present invention, there is provided a scanning optical system wherein a light beam deflected by an optical deflector is scanned on a scanning surface in a main scanning direction through said scanning optical system, comprising: an image forming lens group consisting first and second lenses, in this order from said deflector side, at least one of said first and second lenses being shifted in a direction perpendicular to an optical axis thereof in a sub-scanning direction which is normal to said main scanning direction; a correction lens for correcting a deviation of laser beam from the standard optical axis which is caused by a tilt of a surface of said light deflector; and a light interrupting member disposed between said image forming lens system and said scanning surface so as to prevent light reflected on a surface in said image forming lens group from reaching said scanning surface.

The lens shifted in the direction perpendicular to the optical axis is preferably a plastic lens; and a gate is formed at a circumference of the lens when the lens is formed; and the lens is preferably shifted in such a manner that the gate is isolated from the optical axis. In plastic lenses, influence is removed when the lens is shifted such that the gate is moved in a direction away from the optical axis.

The present disclosure relates to subject matter contained in Japanese patent application Nos. 5-325353 (filed on Dec. 22, 1993), 6-80744 (filed on Apr. 19, 1994) and 6-226563 (filed on Sep. 21, 1994) which are expressly incorporated herein by reference in their entirety.

BRIEF DESCRIPTION OF THE DRAWINGS

The present invention will be described below in detail with reference to the accompanying drawings, in which:

FIG. 1 is a plan view of a scanning optical system according to the first embodiment of the present invention;

FIG. 2 is a front view of the scanning optical system shown in FIG. 1;

FIG. 5 a plan view of a scanning optical system according to the second embodiment of the present invention;

FIG. 6 is a front view of the scanning optical system shown in FIG. 5;

FIG. 12 is a plan view of a scanning optical system according to the fourth embodiment of the present invention;

FIG. 13 is a front view of the scanning optical system shown in FIG. 12;

FIG. 21 is a plan view of a scanning optical system according to the seventh embodiment of the present invention;

FIG. 22 is a front view of the scanning optical system shown in FIG. 21;

FIG. 27 is a plan view of an optical path of a light reflected on the inner surface of the image forming lens in the scanning optical system shown in FIG. 25;

FIG. 28 is a partially enlarged view of the optical path illustrated in FIG. 27;

DETAILED DESCRIPTION OF PREFERRED EMBODIMENTS

Figure 3:
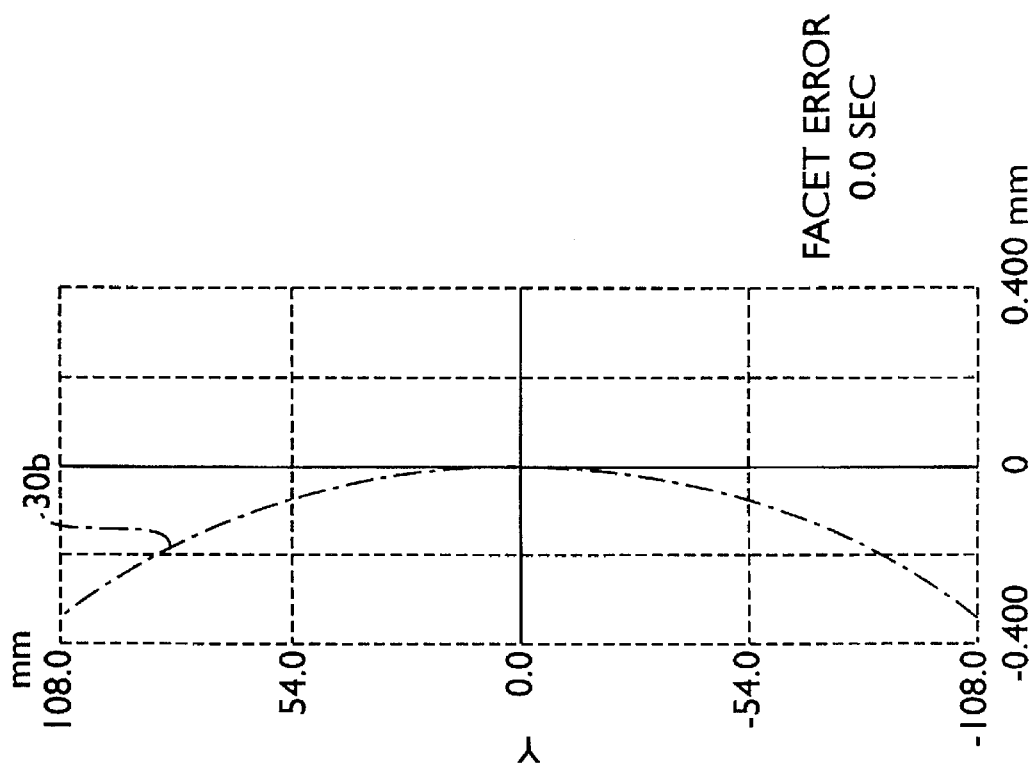
FIG. 3 is a graph showing the bow curve in the scanning optical system illustrated in FIGS. 1 and 2.

A scanning optical system according to the present invention will be explained with reference to drawings.

First Embodiment

FIGS. 1 and 2 show the configuration of the scanning optical system according to the first embodiment of the present invention. In this embodiment, a lens is tilted to provide a deviated optical axis of two surfaces of the scanning lens system from a standard optical axis in the sub-scanning direction. A polygonal mirror 12 rotating about a rotation axis 11 as an optical deflector is illustrated in FIG. 1. As is well known, a laser beam emitted from a semiconductor laser 13 passes through a collimating lens 17, a cylindrical lens 18, and hits the polygonal mirror 12. The light beam is reflected and scanned by each reflection surface 12R. Then, the light beam is further scanned on a scanning surface 14 by way of a scanning lens system 20. In the case of a laser printer, the scanned surface 14 is a photosensitive drum for instance. Between the scanning lens system 20 and scanned surface 14 is disposed a light interrupting member 15 to prevent ghosting light from reaching the scanned surface 14. The light interrupting member 15 includes a slit 15a extending in the main scanning direction.

If the reflection surfaces 12R are not tilted, i.e., the surfaces 12R are normal to an optical axis of the collimating lens 17 and the cylindrical lens 18, a scanned laser beam reflected by the reflection surfaces 12R passes a main (standard) scanning plane including a standard optical axis. Namely, the standard scanning axis is defined by an optical axis of the collimating lens 17 and the main scanning plane is defined by a plane which is formed by a scanned light passed the collimating lens 17 and reflected by the reflection surfaces 12R when the polygonal mirror 12 is rotated. Therefore, in a general scanning optical system, the optical axes of the lenses of the scanning lens system 20 including anamorphic lens system are situated on the standard scanning plane. Namely, the optical axes of the lenses of the scanning lens system 20 are coincident with the standard optical axis in the sub-scanning direction.

In this embodiment, a first lens 21 which constitutes the scanning lens system 20 in combination with a second lens 22 is tilted in the sub-scanning direction about a center 21R which is the scanned surface 14 side of the lens to provide a deviated optical axis of the first surface 21a and the second surface 21b away from the standard scanning axis, thereby light reflected by the first and second surfaces 21a, 21b and proceeding towards the scanned surface 14 reaches a position away from the main scanning plane, which prevents ghosting light forming on the scanned surface 14. In other words, centers of radius of curvatures of the surfaces 21a and 21b in the sub-scanning direction are not located on the standard scanning plane. The light interrupting member 15 prevents ghosting light which may occur due to the tilted first lens 21 from reaching the scanned surface 14. In this case, "bowing" is generated but is small enough so that the scanning optical system suffers no significant deterioration since the tilting is small.

FIG. 3 shows the bow curve in the scanning lens system 20 with the detailed specification indicated in Table 1 in which the first lens 21 is tilted in the sub-scanning direction by 1° about a point 21.5 mm away from the rear of the second surface 21b, this point is used as the tilt center 21R. In this figure, ordinates indicate the position in the main scanning direction and abscissas show the amount of shift of the scanned light from the standard scanning plane, in the sub-scanning direction, and a one-dot chain line 30 shows an actual scanned line, which shows that the bow is effectively restricted. In reality, the base to which the lens 21 is attached is preferably moved to tilt the lens. Note that in the numerical embodiments the sign (+) and (−) of tilt angle is given when the surface is rotated upwardly and downwardly, respectively.

Figure 4:
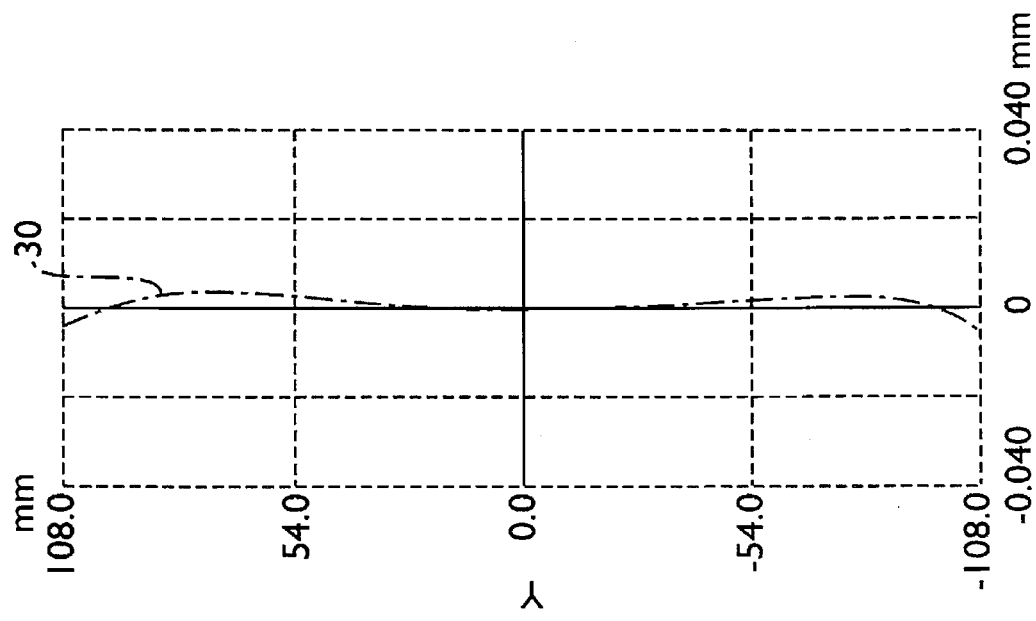
FIG. 4 is a graph showing the bow curve in the scanning optical system illustrated in FIGS. 1 and 2, but with the first lens tilted about a center different from that of the system in FIG. 1 and 2 for comparison.

FIG. 4 shows the condition of the bow 30b when the first lens 21 is tilted 1° about the center of the first surface 21a. In this case, the bow is larger in comparison with the case shown in FIG. 3, but the magnitude of the bow is acceptable overall.

In the Tables, "f" is focal distance, "$f_B$" back focal distance, "R" radius of curvature of surfaces of lenses in the main scanning direction (cross-section), "Rz" radius of curvature of lenses in in the sub-scanning direction (cross-section), "D" is the thickness of the lenses or distance between lenses, and "N" is the refractive index of the d-line. In the following tables, the surface numbers of the optical elements are listed sequentially from the polygonal mirror 12; that is from the left in Figures.

TABLE 1

| f = 178.778 | | | | |
| $f_B$ = 201.330 | | | | |
| Surface No. | R | Rz | D | N |
| --- | --- | --- | --- | --- |
| surface 12 R | | | 18.64 | |
| 1 | −149.380 | −149.380 | 20.00 | 1.60910 |
| 2 | ∞ | 52.800 | 9.35 | |
| 3 | ∞ | ∞ | 16.00 | 1.71230 |
| 4 | −83.000 | −26.600 | 201.33 | |

Second Embodiment

FIGS. 5 and 6 show the configuration of the scanning optical system according to the second embodiment of the present invention.

Like the first embodiment, in this embodiment, a lens is tilted to provide a deviated optical axis for the two surfaces of the scanning lens system away from the standard scanning plane. In the drawings indicating the second embodiment and those that follow, optical members other than the scanning lens system 20 are omitted.

In the second embodiment, the second lens 22 which constitutes the scanning lens system 20 in combination with the first lens 21 Is tilted about the center 22R on the side of the scanned surface 14 to provide a deviated optical axis of the third surface 22a and the fourth surface 22b from this standard plane. The centers of radius of curvatures of the surfaces 21a and 21b in the sub-scanning direction are not located on the main scanning plane.

Figure 7:
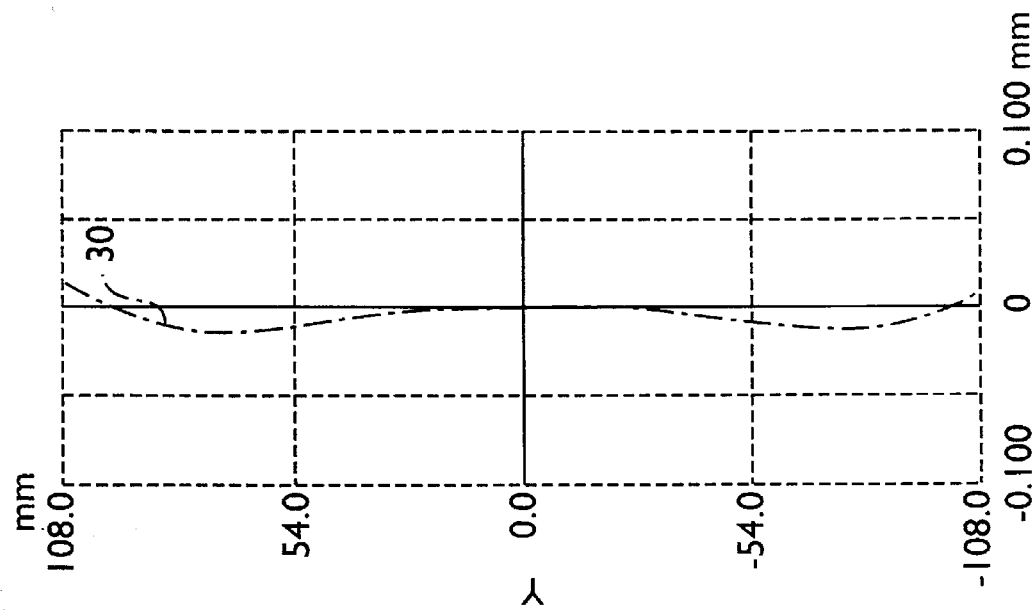
FIG. 7 is a graph showing the bow curve in the scanning optical system illustrated in FIGS. 5 and 6.

FIG. 7 shows the bow curve in the scanning optical system 20 with a detailed specification indicated in Table 1 in which the second lens 22 is tilted in the sub-scanning direction by 1° about a point 1.0 mm away from the rear of the fourth surface 22b which is used as a tilt center 22R. As is shown by the one-dot chain line, the bowing has been effectively restricted.

Figure 8:
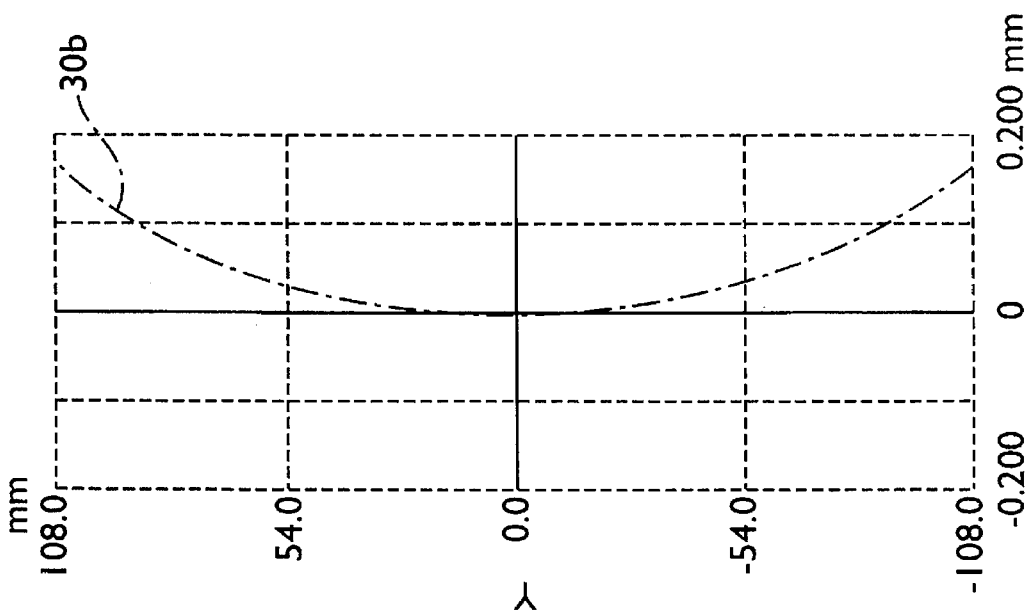
FIG. 8 is a graph showing the bow curve in the scanning optical system illustrated in FIGS. 5 and 6, but with the first lens tilted about a center different from that of the system in FIG. 5 and 6 for comparison.

FIG. 8 shows the bow curve 30b when the first lens 21 is tilted In the sub-scanning direction by 1° about the center of the third surface 22a. In this case, the bow is larger in comparison with the case shown in FIG. 7, but the magnitude of the bow is still tolerable overall.

TABLE 2

| f = 178.778 $f_B$ = 201.330 Surface No. | R | Rz | D | N |
| --- | --- | --- | --- | --- |
| surface 12 R | | | 18.64 | |
| 1 | −149.380 | −149.680 | 20.00 | 1.60910 |
| 2 | ∞ | 52.800 | 9.35 | |
| 3 | ∞ | ∞ | 16.00 | 1.71230 |
| 4 | −83.000 | −26.600 | 201.33 | |

Third Embodiment

Figure 9:
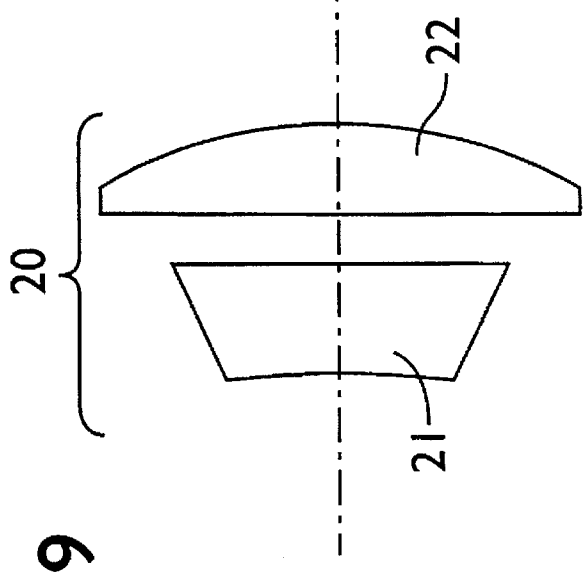
FIG. 9 is a plan view of a scanning optical system according to the third embodiment of the present invention.
Figure 10:
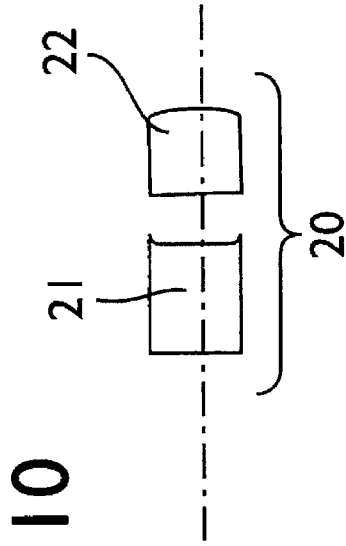
FIG. 10 is a front view of the scanning optical system shown in FIG. 9.

FIGS. 9 and 10 show the configuration of the scanning optical system according to the third embodiment of the present invention. In this embodiment, two different lenses are moved while being kept parallel to each other with respect to the standard optical axis in the same directions and in the sub-scanning direction to provide a deviated optical axis of the two surfaces in the scanning optical system away from the standard scanning plane. In this embodiment, the centers of radius of curvatures of the first, second and fourth surfaces in the sub-scanning direction are not located on the standard scanning plane.

Figure 11:
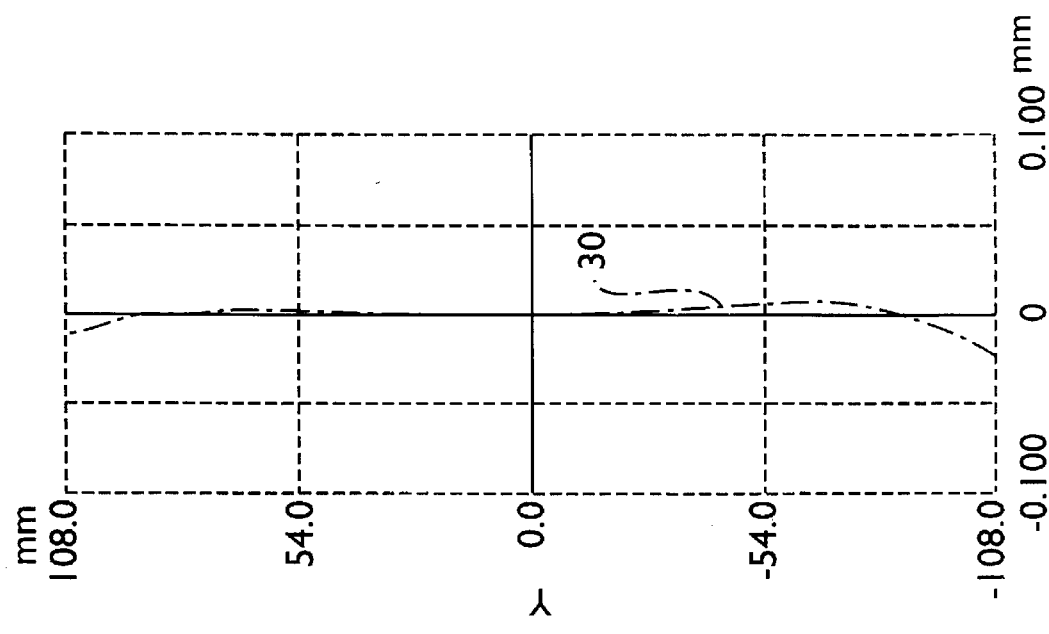
FIG. 11 is a graph showing the bow curve in the scanning optical system illustrated in FIGS. 9 and 10.

FIG. 11 shows the bow curve in the scanning optical system 20 with the detailed specification indicated in Table 3 in which the first lens 21 and the second lens 22 are shifted while being kept parallel with respect to each other at a distance of 1.0 mm and 0.8 mm respectively in the sub-scanning direction. As indicated by the one-dot chain line, the bow 30 is effectively restricted. In reality, the shift of the lenses 21 and 22 are preferably carried out by shifting the base to which the lenses are attached.

TABLE 3

| f = 178.778 $f_B$ = 201.330 Surface No. | R | Rz | D | N |
| --- | --- | --- | --- | --- |
| surface 12 R | | | 18.64 | |
| 1 | −149.380 | −149.380 | 20.00 | 1.60910 |
| 2 | ∞ | 52.800 | 9.35 | |
| 3 | ∞ | ∞ | 16.00 | 1.71230 |
| 4 | −83.000 | −26.600 | 201.33 | |

Fourth Embodiment

FIGS. 12 and 13 illustrate the configuration of the scanning optical system according to the fourth embodiment of the present invention. In this embodiment, two different lenses are shifted while being kept parallel to each other in the different directions from each other and in the sub-scanning direction to provide a deviated optical axis for the two surfaces of the scanning lens system away from the standard scanning plane.

Figure 14:
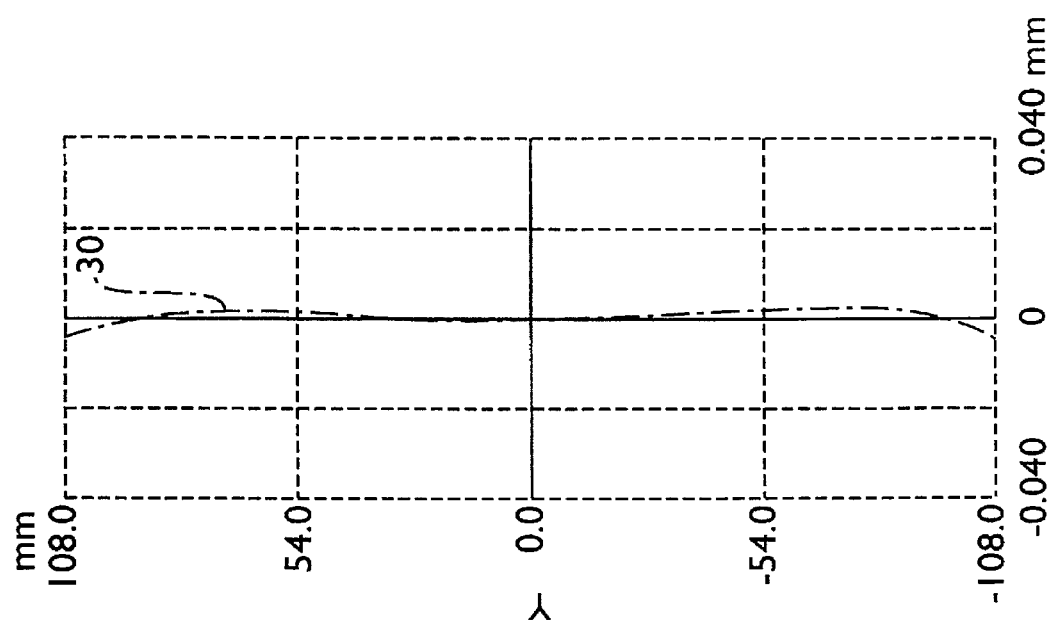
FIG. 14 is a graph showing the bow curve in the scanning optical system illustrated in FIGS. 12 and 13.

FIG. 14 shows the bow curve in the scanning optical system 20 with the detailed specification as indicated in Table 4 in which the first lens 21 and the second lens 22 are shifted while being kept parallel with respect to each other at a distance of 10.0 mm and −9.8 mm respectively in the sub-scanning direction. As is indicated by the one-dot chain line, the bow 30 is effectively restricted. In the embodiment, the scanning lens system 20 comprises the first lens 21, the second lens 22 and the third lens 23. The first and second lenses 21, 22 are attached to the same base.

TABLE 4

| f = 179.680 $f_B$ = 85.440 Surface No. | R | Rz | D | N |
| --- | --- | --- | --- | --- |
| surface 12 R | | | 55.00 | |
| 1* | 1000.000 | 1000.000 | 8.350 | 1.48479 |
| 2 | −266.384 | −266.384 | 20.000 | |
| 3 | −1000.000 | 1000.000 | 12.530 | 1.48479 |
| 4 | −266.660 | −266.600 | 86.680 | |
| 5 | −744.000 | 26.300 | 5.000 | 1.48479 |
| 6 | −704.000 | −704.000 | 85.440 | |

*indicates aspherical surface.

Aspherical data;

$K=0.43594, A4=-1.02285 \times 10^{-7}, A6=1.53885 \times 10^{-11}, A8=-1.22494 \times 10^{-15}$.

The shape of the aspheric surface can be generally expressed as follows.

$$X=CY^2/\{1+[1-(1+K)C^2Y^2]^{1/2}\}+A_4Y^4+A_6Y^6+A_8Y^8+A_{10}Y^{10}+$$

wherein

Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents a eighth-order aspherical factor, and $A_{10}$ represents a tenth-order aspherical factor.

Fifth Embodiment

Figure 15:
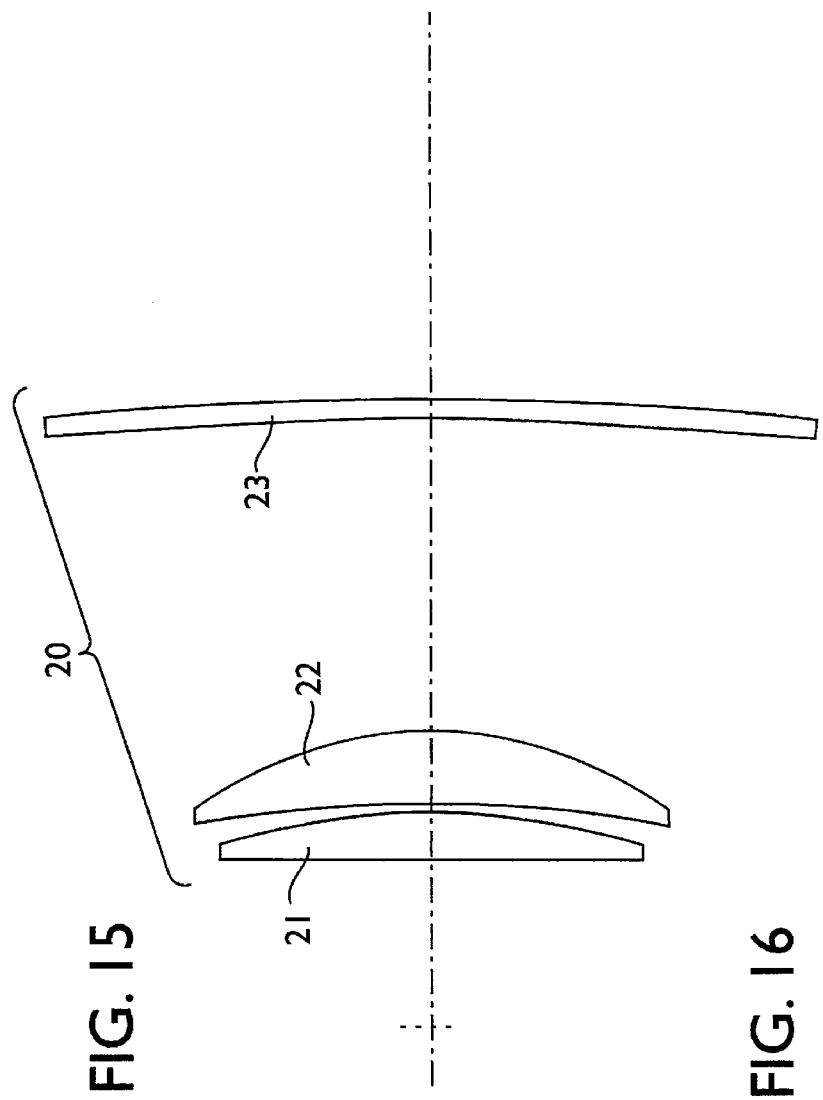
FIG. 15 is a plan view of a scanning optical system according to the fifth embodiment of the present invention.
Figure 16:
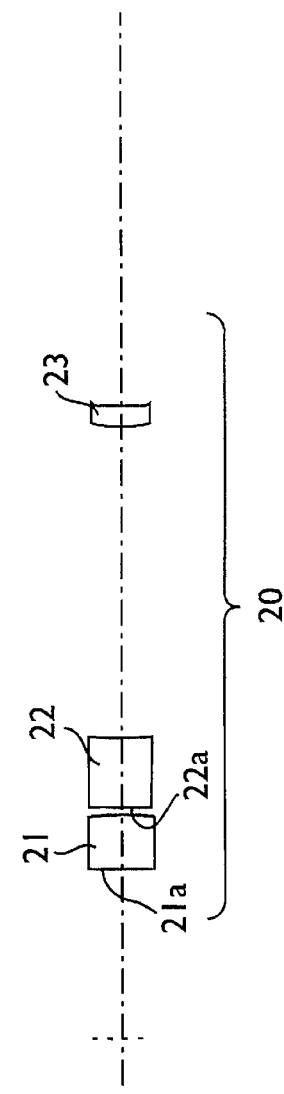
FIG. 16 is a front view of the scanning optical system shown in FIG. 15.

FIGS. 15 and 16 are the configuration of the scanning optical system according to the fifth embodiment of the present invention. In this embodiment, each single surface 21a, 22a of each of the two different lenses 21, 22 is tilted to provide a deviated optical axis for the two surfaces of the scanning lens system away from the standard scanning plane. A plastic lens with only one tilted surface can be obtained by tilting a surface of a molding die for the lens in advance.

In this embodiment, the centers of radius of curvatures of the surfaces 21a and 22a in the sub-scanning direction are not located on the standard scanning plane.

Figure 17:
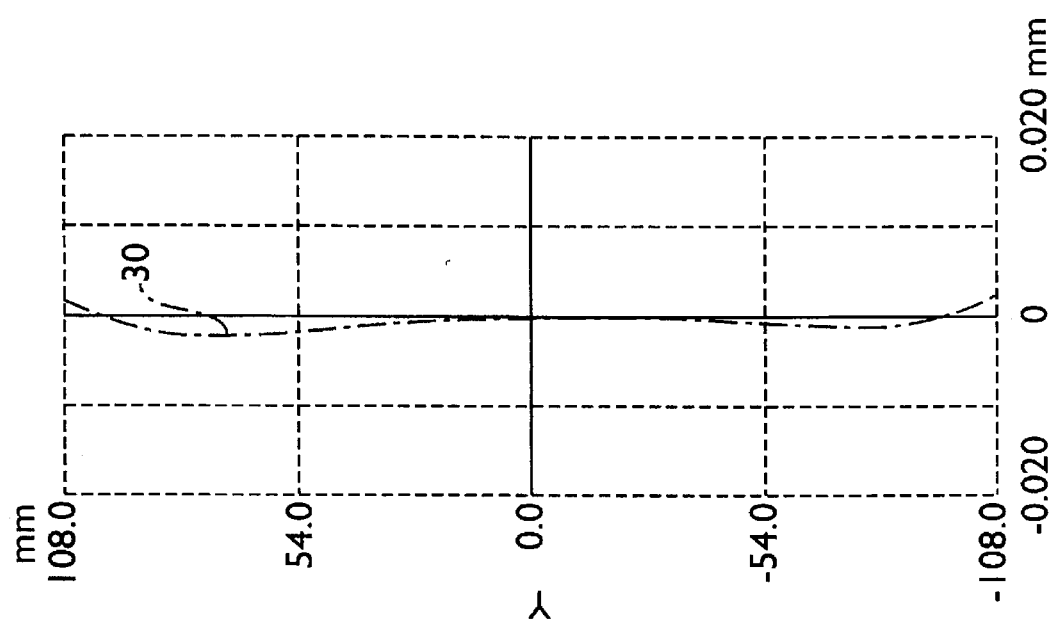
FIG. 17 is a graph showing the bow curve in the scanning optical system illustrated in FIGS. 15 and 16.

FIG. 17 shows the bow curve in the scanning optical system 20 in which the first surface 21a of the first lens 21 and the third surface 22a of the second lens 22 are titled in the sub-scanning direction by 1.0 ° and −1.5° respectively by using a molding die. As indicated by the one-dot chain line, the bow is effectively restricted. Note that the centers of radius of curvatures of the second and fourth surfaces in the sub-scanning direction are located on the standard scanning plane.

TABLE 5

| f = 135.032 |
|---|
| $f_B$ = 49.675 |

| Surface No. | R | Rz | D | N |
|---|---|---|---|---|
| surface 12 R | | | 40.400 | |
| 1* | 850.000 | 850.000 | 13.000 | 1.48479 |
| 2 | −146.741 | −146.741 | 2.000 | |
| 3 | −260.246 | 260.246 | 18.000 | 1.48479 |
| 4 | −86.452 | −86.452 | 76.627 | |
| 5 | −962.549 | 19.220 | 5.000 | 1.48479 |
| 6 | −961.030 | −961.030 | 49.675 | |

*indicates aspherical surface.

Aspherical data;

$K$=−3.3693, $A4$=−2.46288×10$^{-7}$, $A6$=4.86578×10$^{-11}$, $A8$=−6.02851×10$^{-15}$

Sixth Embodiment

Figure 18:
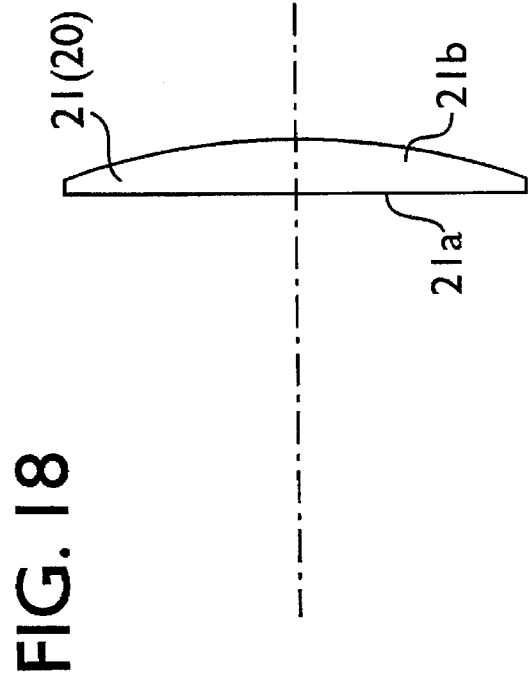
FIG. 18 is a plan view of a scanning optical system according to the sixth embodiment of the present invention.
Figure 19:
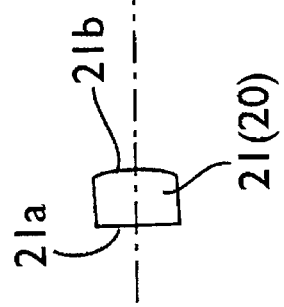
FIG. 19 is a front view of the scanning optical system shown in FIG. 18.

FIGS. 18 and 19 are the configuration of the scanning optical system according to the sixth embodiment of the present invention. In this embodiment, only a single scanning lens constitutes the scanning lens system and the front and rear surfaces thereof are tilted by different angles away from each other to provide eccentric optical centers of the two surfaces of the scanning lens system from the standard scanning plane. The plastic lens with different tilted angles on the front and rear surfaces thereof is made by tilting surfaces of the molding die when manufacturing the scanning system.

Figure 20:
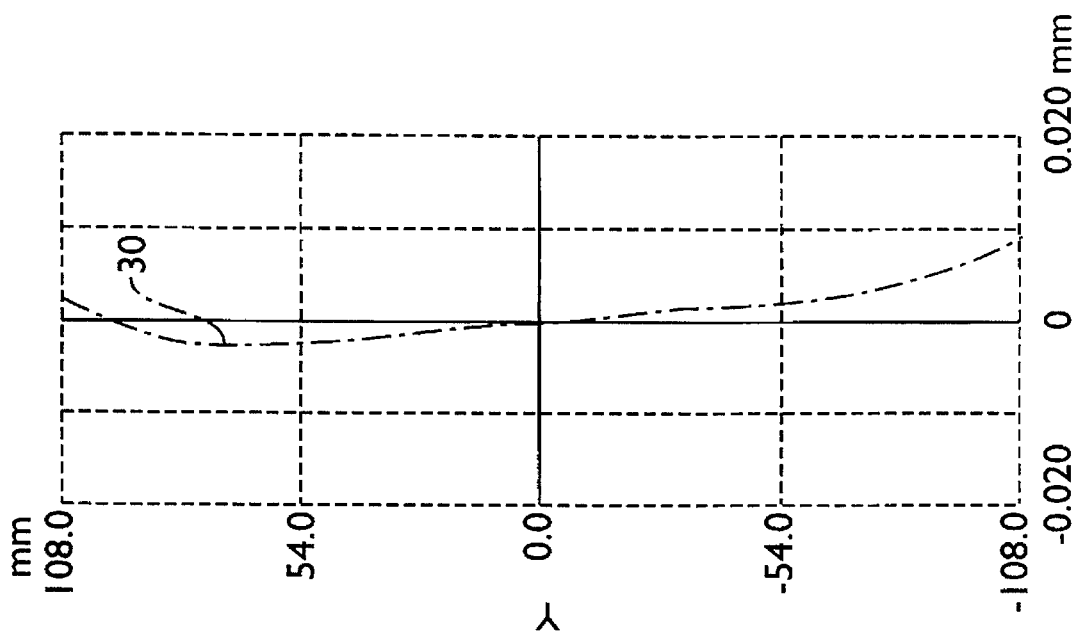
FIG. 20 is a graph showing the bow curve in the scanning optical system illustrated in FIGS. 18 and 19.

FIG. 20 shows the bow curve in the scanning optical system 20 in which the first surface 21a and the second surface 21b of the first lens 21 are tilted by 1.0° and 0.97° respectively by using a molding die. As indicated by the one-dot chain line, the bow 30 is effectively restricted.

TABLE 6

| f = 245.216 |
|---|
| $f_B$ = 238.000 |

| Surface No. | R | Rz | D | N |
|---|---|---|---|---|
| surface 12 R | | | 68.000 | |
| 1 | ∞ | ∞ | 10.000 | 1.53830 |
| 2 | −132.000 | −36.300 | 238.000 | |

The following explanation is directed to the scanning optical system according to the present invention in which ghosting caused by light reflected by the internal surfaces of lenses are prevented. FIGS. 21 and 22 show the scanning optical system 20 which comprises one image forming lens (fθ lens) 21 and a correction lens 22 for correcting the tilt of the reflection surface 12R of a polygonal mirror 12 which is shown as a light deflector. The mirror 12 rotates about a rotation axis 11. In this embodiment, the power in the main scanning direction is mainly given by the image forming lens 21.

As explained in FIG. 1, a laser beam emitted from a semiconductor laser 13 passes through a collimating lens 17, a cylindrical lens 18, and hits the polygonal mirror 12. The light beam is reflected and scanned by each reflection surface 12R. Then, the light beam is further directed onto a scanning surface 14 by way of a scanning lens system 20. In case of a laser printer, the scanned surface 14 is a photosensitive drum for instance. Between the image forming lens 21 and the correction lens 22 is disposed a light interrupting member 15 to prevent ghosting light from reaching the scanned surface 14. The light interrupting member 15 includes a slit 15a extending in the main scanning direction. The light interrupting member 15 is situated in such a manner that the slit 15a does not interrupt a normal light but interrupts only the light reflected by the surfaces of the image forming lens 21. The light interrupting member may include a knife edge.

This aspect of the present invention is characterized in that the image forming lens 21 of the scanning lens system 20 is shifted in the direction perpendicular to the optical axis to deflect the ghosting light caused by internal reflection of the lens, and the light interrupting member 15 is mounted to prevent the ghosting light from reaching the scanning surface 14. The image forming lens 21 is further tilted to mitigate the bow.

Figure 23:
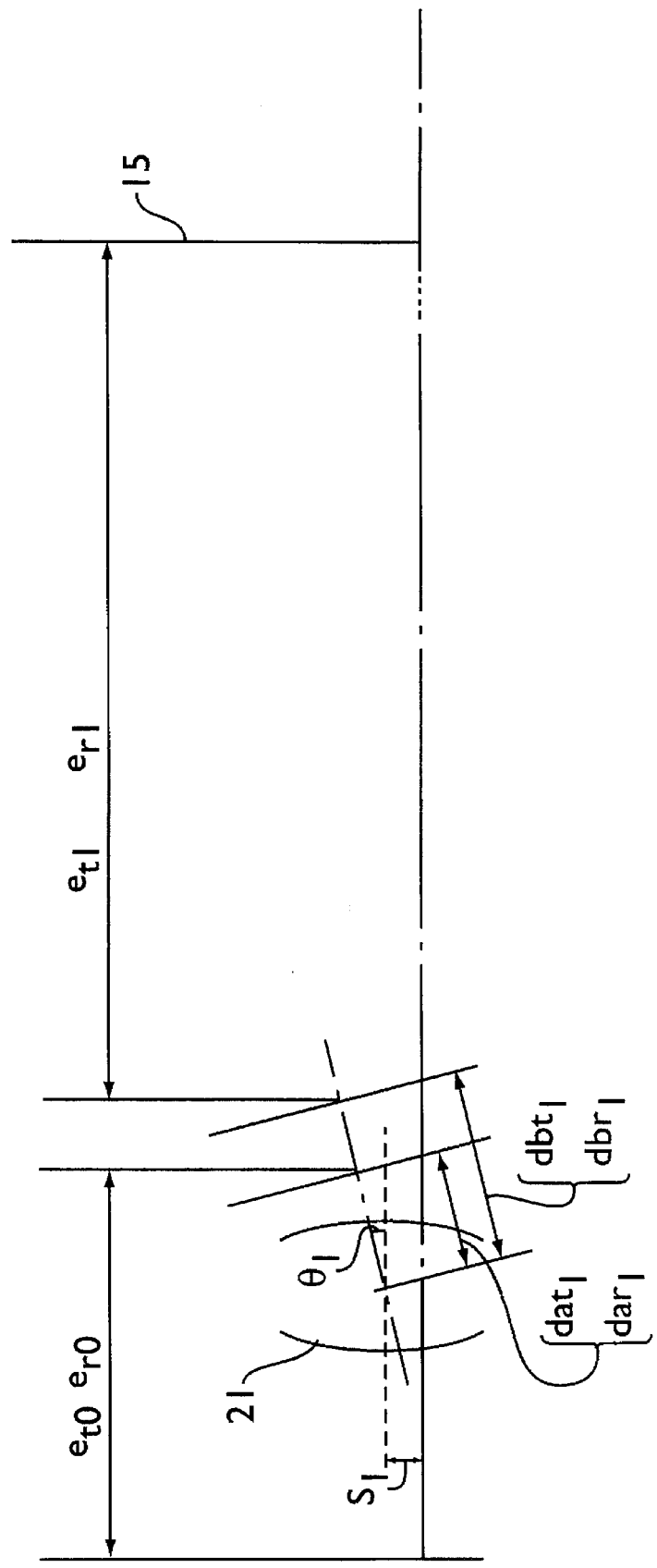
FIG. 23 is the traces of a normal light and a light reflected on the inner surface of an image forming lens which is shifted from the optical axis and tilted in the scanning optical system illustrated in FIGS. 21 and 22.

FIG. 23 shows the traces of a normal light (transmitting light) and a light reflected on the inner surface of the image forming lens 21 when the image forming lens 21 of the scanning lens system 20 is shifted by $S_1$ distance in the direction perpendicular to the optical axis and is tilted by $\theta_1$ degrees. This tracing is characterized in that an optical system in which light passes through a lens after being reflected on the internal surface thereof twice is regarded as a single lens. Note that in the following formulae, contrary to in the case of numerical embodiments, the sign (+) and (−) of tilt angle is given when the surface is rotated downwardly and upwardly, respectively.

In FIG. 23:

$e_{t0}$ is a distance in the direction of the optical axis between an incident point (a point on an optical axis between the image forming lens 21 and a light source) and the first principal point of the lens 21 for the normal light (transmitting light);

$e_{r0}$ is a distance in the direction of optical axis between the incident point and the first principal point of the image forming lens 21 for the light reflected on the internal surface of the lens;

$e_{t1}$ is a distance between the second principal point of the image forming lens 21 for normal light (transmitting light) and the light interrupting member 15;

$e_{r1}$ is the distance between the second principal point of the image forming lens 21 for the light reflected on the internal surface of the lens and the light interrupting member 15;

$dat_1$ is the distance between the thickest center part and the first principal point of the imaging first lens for normal light;

$dar_1$ is the distance between the thickest center part of the lens and the first principal point of the first lens for the light reflected on the internal surface of the lens;

$dbt_1$ is the distance between the thickest center part and the second principal point of the imaging first lens for normal light;

$dbr_1$ is the distance between the thickest center part of the lens and the second principal point of the first lens for the light reflected on the internal surface of the lens;

$f_{t1}$ is the focal length of the image forming lens 21 for transmitting light of the lens; and $f_{r1}$ is the focal length of the image forming lens 21 for light reflected on the internal surface of the lens.

The angle (rad.) $U_{01}$ that normal light (printing ray) emitted from the image forming lens 21, the height $h_{o1}$ of the light entering the image forming lens 21, and the height $h_{o2}$ of the light after emitted from the image forming lens 21 are determined by the following formulae. In the formulae, $u_{00}$ is an angle of the incident light to the optical system at the incident point and $h_{00}$ is the height of the light from the optical axis at the incident point. Generally, both $u_{00}$ and $h_{00}$ are zero.

$$u_{01}=u_{00}+(h_{01}-S_1+dat_1\cdot\theta_1)/f_{t1}$$

$$h_{01}=h_{00}-u_{00}\cdot e_{r0}$$

$$h_{02}=h_{01}-(dbt_1-da_1)\cdot\theta_1-u_{01}\cdot e_{t1}$$

Further, the angle (rad.) $U_{11}$ that the light reflected on internal surface of the image forming lens 21 (ghosting light) emitted from the lens 21, the height $h_{11}$ of the light when entering the image forming lens 21 and the height $h_{12}$ of the light after emitted from the lens 21 are determined by the following formulae:

$$u_{11}=u_{00}+(h_{11}-S_1+dar_1\cdot\theta_1)/f_{r1}$$

$$h_{11}=h_{00}-u_{00}\cdot e_{r0}$$

$$h_{12}=h_{11}-(dbr_1-dar_1)\cdot\theta_2-u_{11}\cdot e_{r1}$$

When "$\phi$" is the diameter of the normal light in the sub-scanning cross-section, the light interrupting member 15 is preferably disposed at a position satisfying the following formula.

$$|h_{12}-h_{02}|>\phi$$

Figure 24:
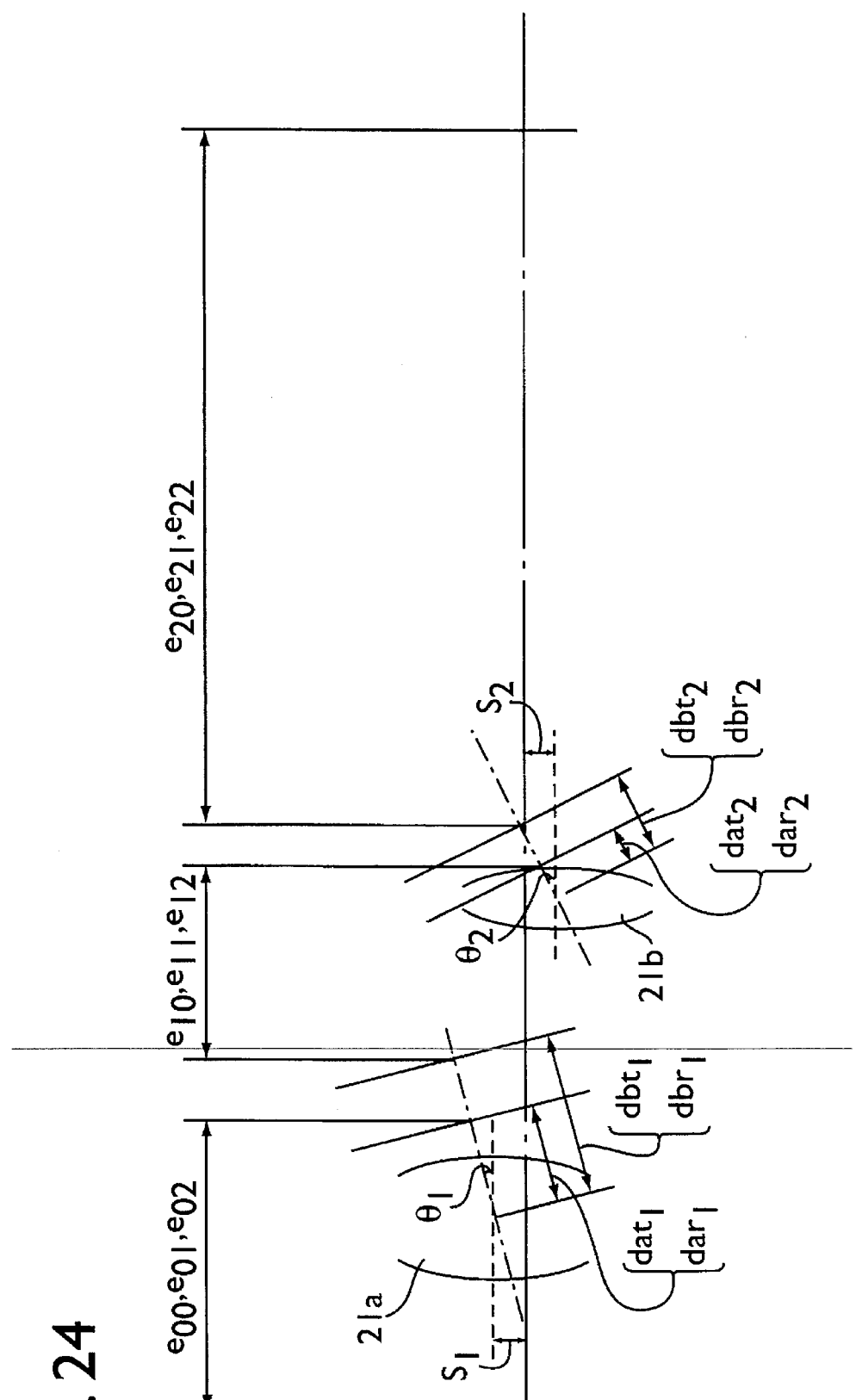
FIG. 24 is the traces of a normal light and a light reflected on the inner surfaces of two image forming lenses which are shifted from the optical axis and tilted in the scanning optical system illustrated in FIGS. 21 and 22.

FIG. 24 shows the traces of the normal light (transmitting light) and the light reflected on the internal surfaces of the first lens 21a and the second lens 21b in the scanning lens system 20. The scanning lens system 20 comprises an image forming lens group (fθ lens) 21 consisting of the first image forming lens 21a and the second image forming lens 21b, and the correction lens 22 for correcting the tilt of the deflection surface 12R of the light deflector 12. In this embodiment, the power in the main scanning direction is mainly given by the image forming lens group 21. The first lens 21a is shifted by the distance $S_1$ in the direction perpendicular to the optical axis and is tilted by $\theta_1$ degree, and the second lens 21b is shifted by $S_2$ distance in the direction perpendicular to the optical axis and is tilted by $\theta_2$ degree. The tracing in this embodiment is characterized in that, like the embodiment shown in FIG. 23, an optical system in which light passes through a lens after being reflected on the internal surface thereof twice is regarded as a single lens.

In FIG. 24:

$e_{00}$ is the distance in the direction of the optical axis between the incident point and the first principal point of the first lens 21a for the normal light (transmitting light);

$e_{01}$ is the distance in the direction of the optical axis between the incident point and the first principal point of the first lens 21a for the light reflected on the inner surface of the lens 21a;

$e_{02}$ is the distance in the direction of the optical axis between the incident point and the first principal point of the first lens 21a for the normal light (transmitting light);

$e_{10}$ is the distance in the direction of the optical axis between the second principal point of the first lens 21a for the normal light (transmitting light) and the first principal point of the second lens 21b for the normal light (transmitting light);

$e_{11}$ is the distance in the direction of the optical axis between the second principal point of the first lens for the light reflected on the internal surface of the first lens 21a and the first principal point of the second lens 21b for the normal light (transmitting light);

$e_{12}$ is the distance in the direction of the optical axis between the second principal point of the first lens 21a for the normal light (transmitting light) and the first principal point of the second lens 21b for the light reflected on the internal surface of the second lens 21b;

$e_{20}$ is the distance in the direction of the optical axis between the second principal point of the second lens 21b for the normal light (transmitting light) and the light interrupting member;

$e_{21}$ is the distance in the direction of the optical axis between the second principal point of the second lens 21b for the normal light (transmitting light) and the light interrupting member;

$e_{22}$ is the distance in the direction of the optical axis between the second principal point of the second lens 21b for the light reflected on the internal surface of the second lens 21b and the light interrupting member;

$dat_n$ is the distance between the thickest center part of the "n"th lens and the first principal point of the "n"th lens for the transmitting light;

$dar_n$ is the distance between the thickest center part of the "n"th lens and the first principal point of the "n"th lens for the light reflected on the internal surface of the lens;

$dbt_n$ is the distance between the thickest center part of the "n"th lens and the second principal point of the "n"th lens for the transmitting light;

$dbr_n$ is the distance between the thickest center part of the "n"th lens and the second principal point of the "n"th lens for the light reflected on the internal surface of the lens;

$ft_n$ is the focal length of the "n"th lens for transmitting light; and $fr_n$ is the focal length of the "n"th lens for the light reflected on the internal surface of the "n"th lens.

The angle that normal light (printing ray) emitted from the first lens 21a and the second lens 21b (rad) $U_{01}$, $U_{02}$, the height $h_{01}$, $h_{02}$ of the light entering the first lens 21 and the second lens 21b, and the height $h_{03}$ of the light after being emitted from the second lens 21b are determined by the following formulae:

$$u_{01}=u_{00}+(h_{01}-S_1+dat_1\cdot\theta_1)/f_{t1}$$

$$u_{02}=u_{01}+(h_{02}-S_2+dat_2\cdot\theta_2)/f_{t2}$$

$$h_{01}=h_{00}-u_{00}\cdot e_{00}$$

$$h_{02}=h_{01}-(dbt_1-dat_1)\cdot\theta_1-u_{01}\cdot e_{01}$$

$$h_{03}=h_{02}-(dbt_2-dat_2)\cdot\theta_2-u_{02}\cdot e_{02}$$

Further, the angle (rad) $u_{11}$, $u_{12}$ that the light reflected on the internal surface of the first lens 21a (ghosting light) emitted from the first lens 21a and the second lens 21b, the height $h_{11}$, $h_{12}$ of the light when entering the first lens 21a and the second lens 21b, the height $h_{13}$ from the optical axis of the light after emitted from the second lens 21b are determined by the following formulae:

$$u_{11}=u_{00}+(h_{11}-S_1+dar_1\cdot\theta_1)/f_{r1}$$

$$u_{12}=u_{11}+(h_{12}-S_2+dat_2\cdot\theta_2)/f_{t2}$$

$$h_{11}=h_{00}-u_{00}\cdot e_{10}$$

$$h_{12}=h_{11}-(dbr_1-dar_1)\cdot\theta_1-u_{11}\cdot e_{11}$$

$h_{13}=h_{12}-(dbt_2-dat_2)\cdot\theta_2-u_{12}\cdot e_{12}$

Further, the angle (rad) $u_{21}$, $u_{22}$ that the light reflected on internal surface of the second lens 21b (ghosting light) emitted from the first lens 21a and the second lens 21b, the height $h_{21}$, $h_{22}$ of the light when entering the first lens 21a and the second lens 21b, the height $h_{23}$ from the optical axis of the light after emitted from the second lens 21b are determined by the following formulae:

$u_{21}=u_{00}+(h_{21}-S_1+dat_1\cdot\theta_1)/f_{r1}$ $u_{22}=u_{21}+(h_{22}-S_2+dar_2\cdot\theta_2)/f_{r2}$ $h_{21}=h_{00}-u_{00}\cdot e_{20}$ $h_{22}=h_{21}-(dbt_1-dat_1)\cdot\theta_1-u_{21}\cdot e_{21}$ $h_{23}=h_{22}-(dbr_2-dar_2)\cdot\theta_2-u_{22}\cdot e_{22}$ When "φ" is the diameter of the normal light in the sub-scanning cross-section, the light interrupting member 15 is preferably disposed at a position satisfying the following formulae:

$|h_{13}-h_{03}|>\phi$ $|h_{23}-h_{03}|>\theta$

Seventh Embodiment

Figure 25:
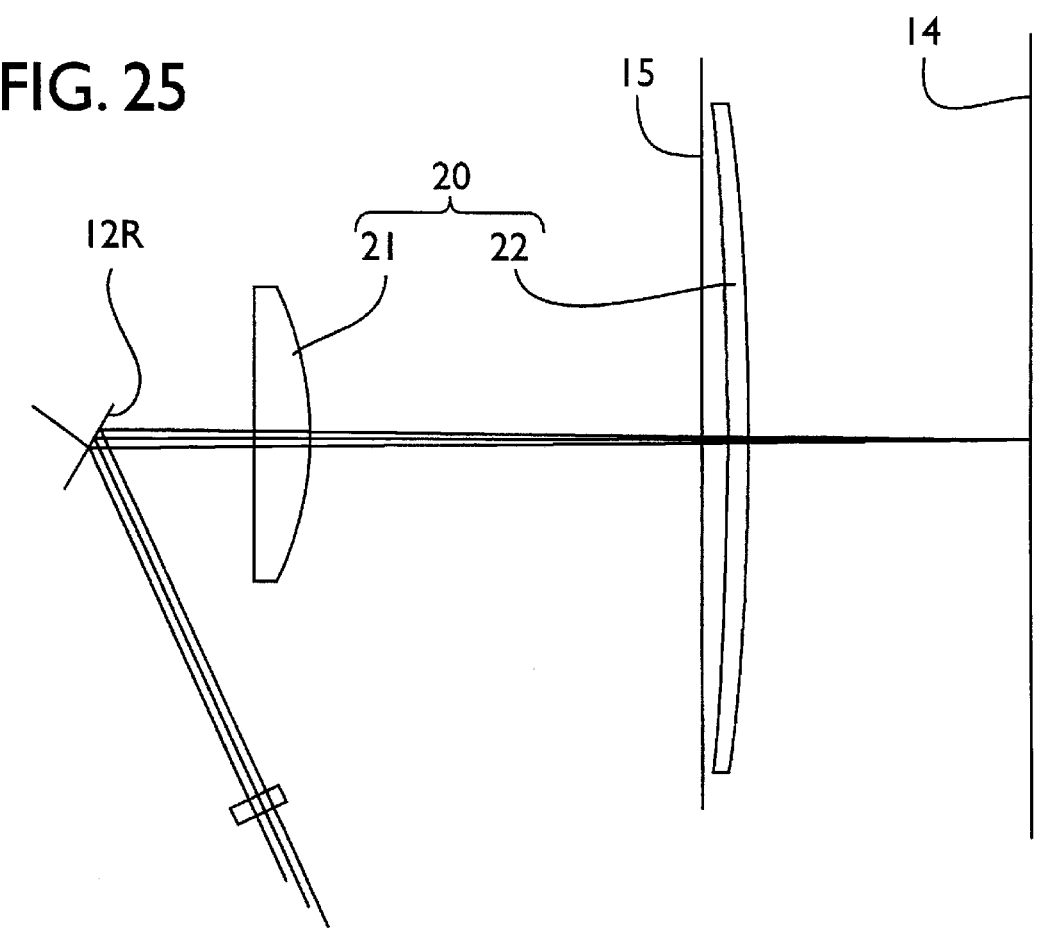
FIG. 25 is a plan view of an optical path of a normal light in a scanning optical system according to the seventh embodiment of the present invention.
Figure 26:
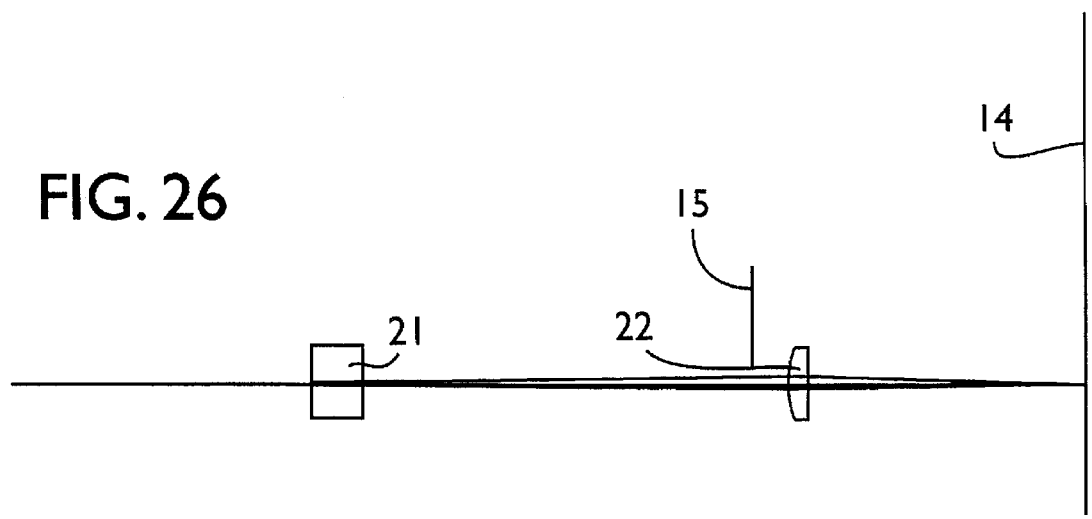
FIG. 26 is a front view of the optical path of the normal light shown in FIG. 25.
Figure 29:
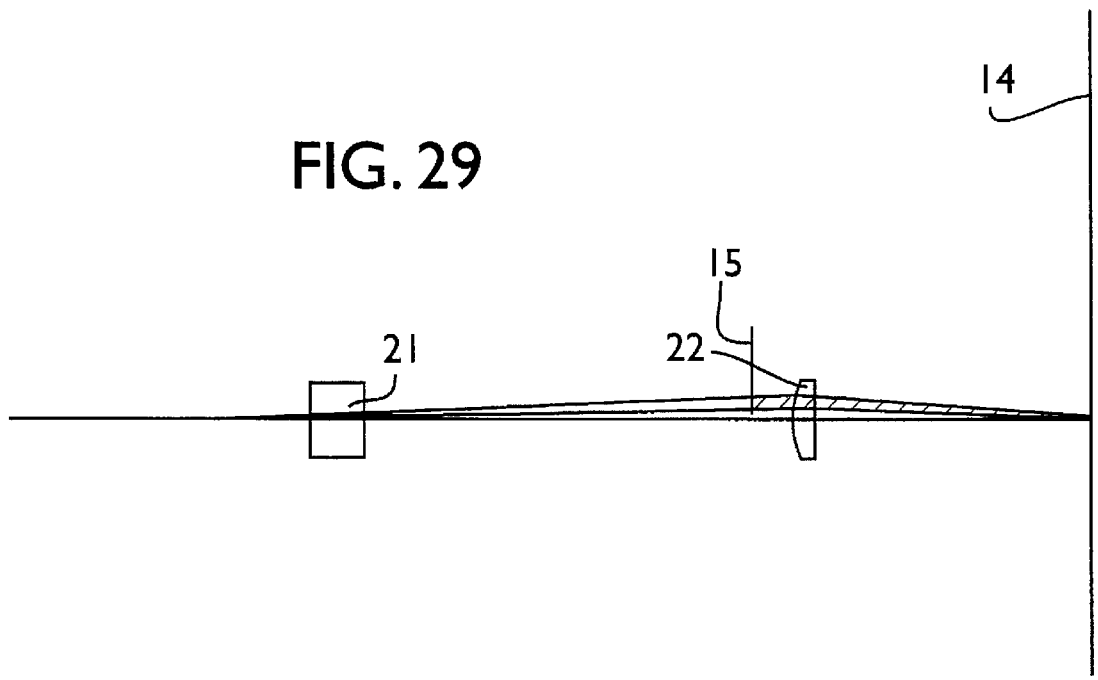
FIG. 29 is a front view of the optical path illustrated in FIG. 27.
Figure 30:
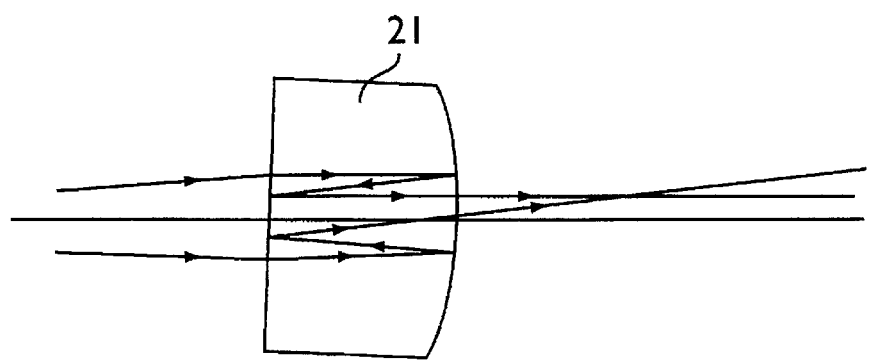
FIG. 30 is a partially enlarged view of the optical path shown in FIG. 29.
Figure 31:
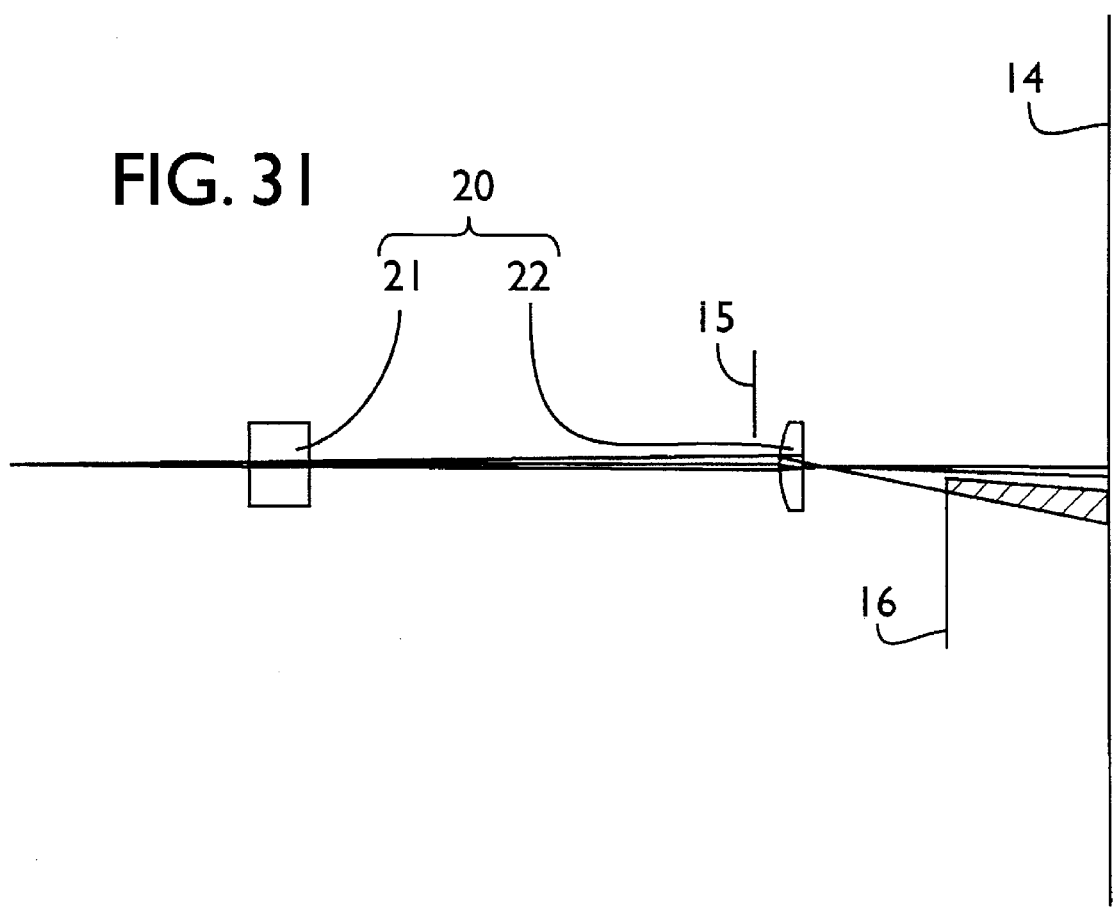
FIG. 31 is a plan view of the scanning optical system illustrated in FIG. 27 and 29 in which a correction lens is further shifted, and a light interrupting member is disposed between the correction lens and scanned surface.

FIGS. 25 to 30 show a scanning optical system according to the seventh embodiment of the present invention. The scanning optical system 20 comprises one image forming lens 21 and one correction lens 22. FIGS. 25 and 26 indicate the optical path of the normal light and FIGS. 27 and 29 indicate the light reflected on the internal surface of the image forming lens 21. FIGS. 28 and 30 are partially enlarged views of the optical paths shown in FIGS. 27 and 29. Portions indicated by the shaded lines in FIGS. 29 and 31 are portions the ghosting light which are interrupted. Table 7 shows the specification of the lens system.

TABLE 7

| f = 180.0 $f_{NO} = 70$ w = 34.38° Surface No. | R | Rz | D | N |
|---|---|---|---|---|
|  |  |  | 40.00 |  |
| 1* | 2049.31 | 2049.31 | 14.00 | 1.48617 |
| 2 | −89.55 | −89.55 | 100.00 |  |
| light intersecting member 15 |  |  | 5.0 |  |
| 3 | −744.00 | 26.25 | 5.0 | 1.48617 |
| 4* | −1093.55 | −1093.55 | 69.27 |  |

*indicates aspherical surface.

Aspherical data;

No.1; K=−0.4606, A4=−2.99513×10⁻⁷, A6=1.06203×10⁻¹¹, A8=−1.90963×10⁻¹⁴.

No.2; K=−0.5130, A4=−5.97983×10⁻⁸, A6=1.25074×10⁻¹².

In this embodiment, the shift of the first lens is 1.00 mm; the tilt of the first lens is 0.4°; the height of the light interrupting member is 2.0 mm; and the diameter of printing light (when used in a laser printer) on the light interrupting member (on the sub-scanning cross-section) is 1.05 mm.

In this embodiment, the maximum bow is 0.036 mm, which shows that the bow is effectively mitigated. No ghosting is observed on the scanning surface 14.

Figure 32:
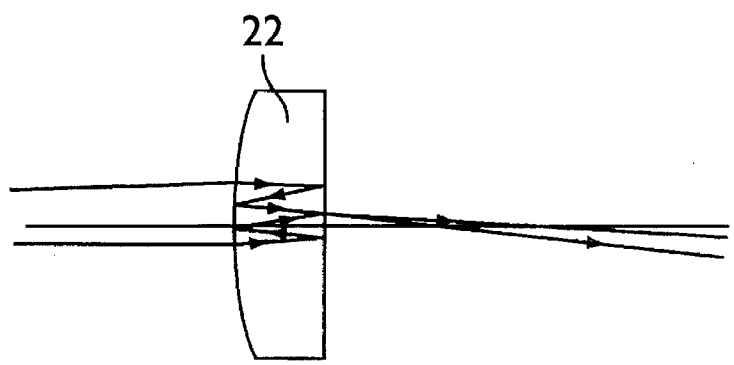
FIG. 32 is a partially enlarged view of the scanning optical system shown in FIG. 31.

FIG. 31 is the scanning optical system according to another embodiment of the present invention in which the correction lens 22 is shifted, and the second light interrupting member 16 is disposed between the correction lens 22 and the scanning surface 14 to mitigate the internal reflection of the correction lens 22 also. FIG. 32 is a partially enlarged view of the system shown in FIG. 31. In this embodiment, the shift of the correction lens 22 is −0.2 mm, and the bow is 0.049 mm. With the configuration of the scanning optical system according to this embodiment, ghosting caused by the correction lens 22 is also mitigated.

Table 8 shows the specification of the above-mentioned lens system illustrated in FIG. 23. Both "$u_{00}$" and "$h_{00}$" are zero.

TABLE 8

Image forming lens 21

| Transmitting (normal) light | Light reflected internal surface |
|---|---|
| $f_{t1}$ ; 176.862 | $f_{r1}$ ; 27.548 |
| $dat_1$ ; 2.045 | $dar_2$ ; 5.562 |
| $dbt_1$ ; 6.605 | $dbr_2$ ; −10.630 |
| $e_{01}$ ; 100.395 | $e_{11}$ ; 117.630 |
| $S_1$ ; 1.0 | $S_1$ ; 1.0 |
| $\theta_1$ ; 0.4 | $\theta_1$ ; 0.4 |
| $u_{01}$ ; −5.573 × 10⁻³ | $u_{01}$ ; −3.489 × 10⁻² |
| $h_{01}$ ; 0 | $h_{11}$ ; 0 |

On the light interrupting member

| Transmitting (normal) light | Light reflected internal surface |
|---|---|
| $h_{02}$ ; 0.528 | $h_{12}$ ; 4.217 |

The light interruption member 15 is situated 100 mm behind from the image forming lens 21.

Eighth Embodiment

Figure 33:
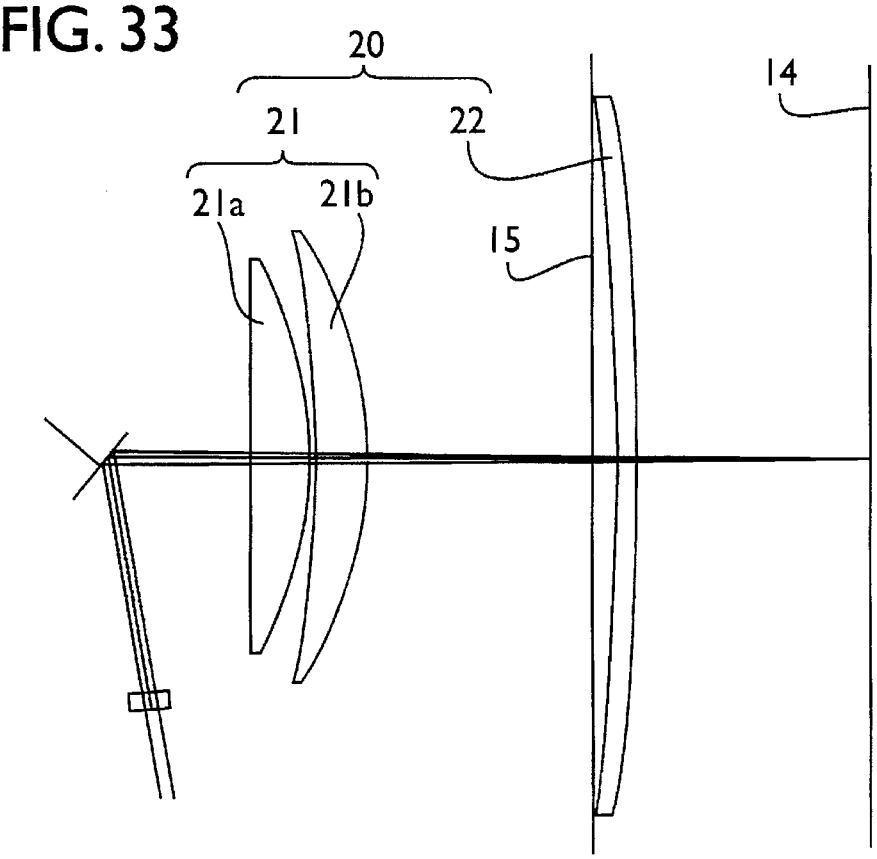
FIG. 33 is a plan view of an optical path of a normal light of a scanning optical system according to the eighth embodiment of the present invention.
Figure 34:
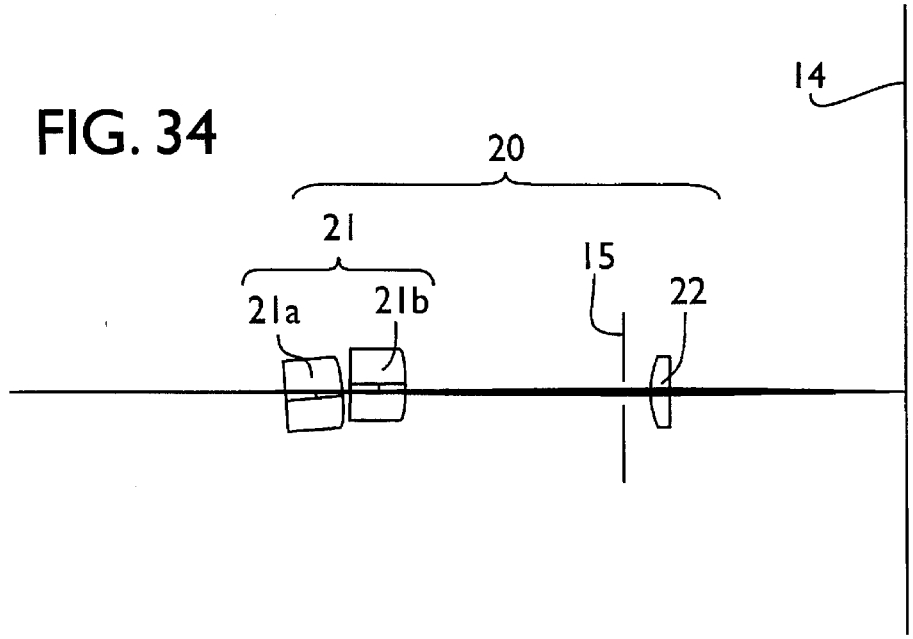
FIG. 34 is a front view of the optical path illustrated in FIG. 33.
Figure 36:
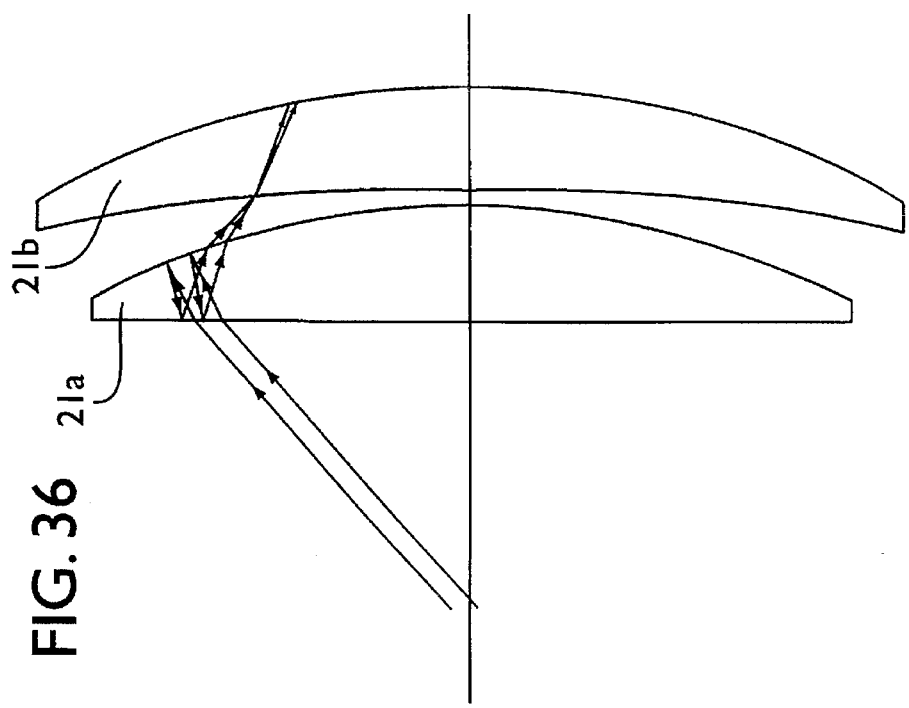
FIG. 36 is a partially enlarged view of the optical path shown in FIG. 35.
Figure 35:
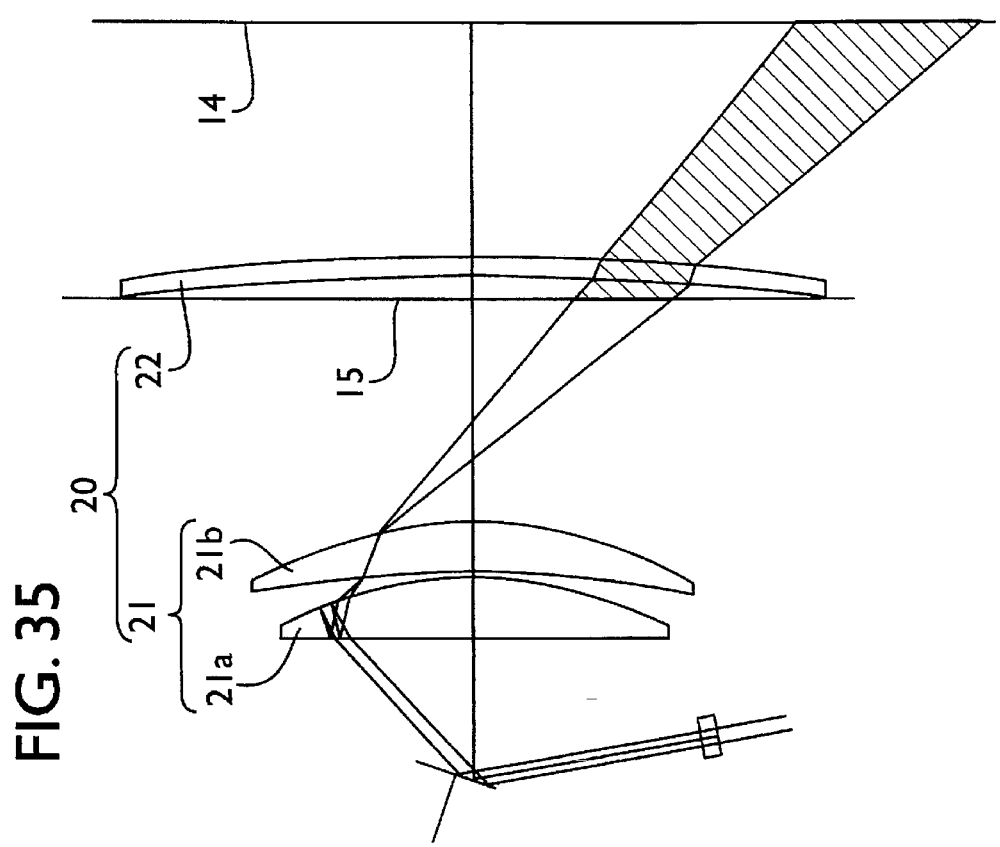
FIG. 35 is a plan view of an optical path of a light reflected on the inner surface of the first lens of the image forming lens group in the scanning optical system shown in FIG. 33.
Figure 37:
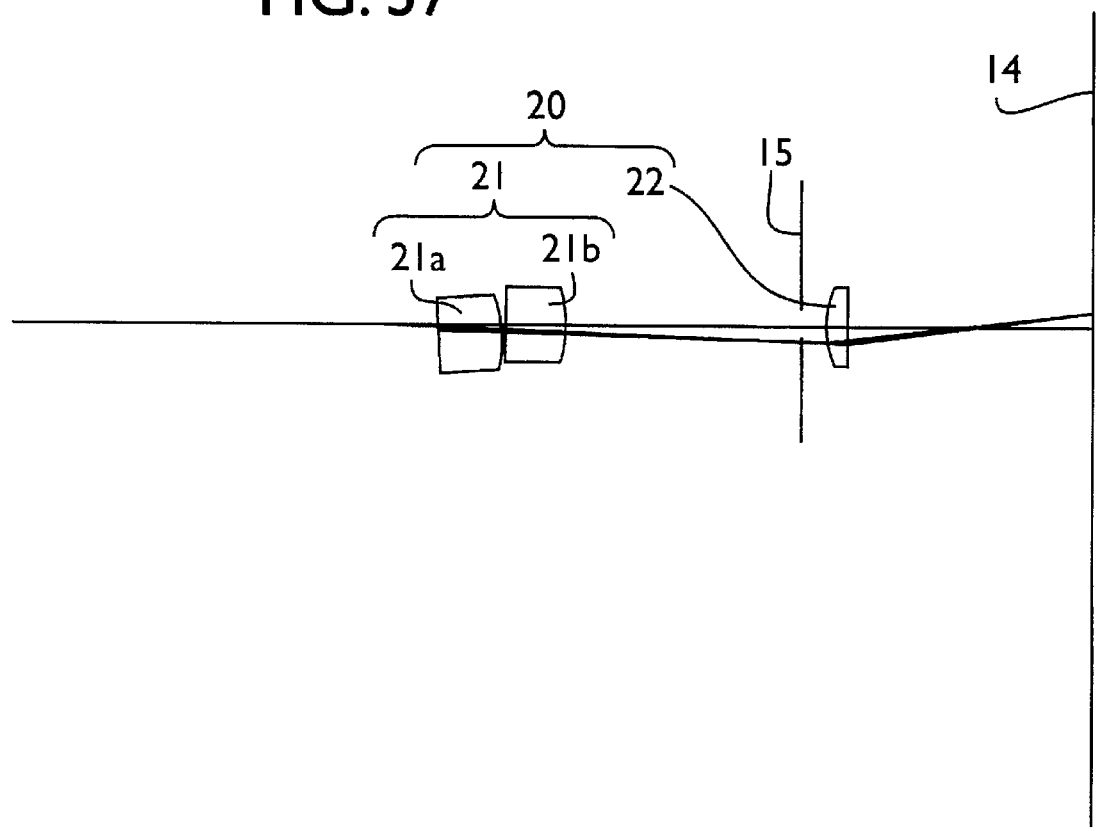
FIG. 37 is a front view of the optical path shown in FIG. 35.
Figure 38:
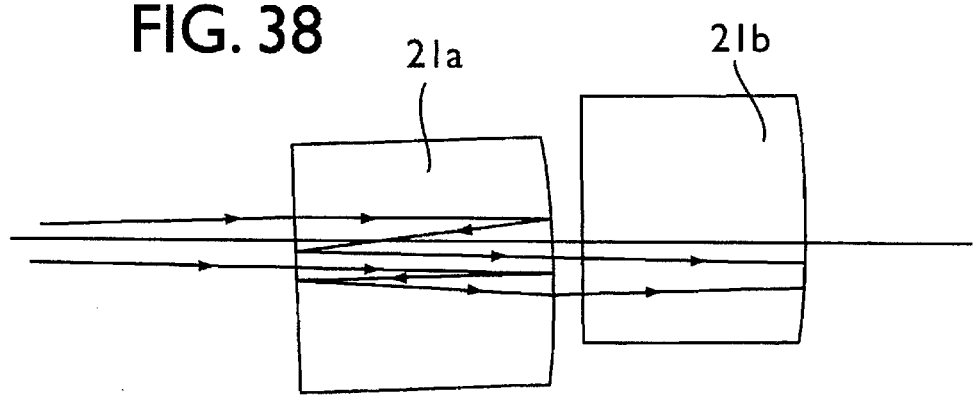
FIG. 38 is a partially enlarged view of the optical path shown in FIG. 37.
Figure 40:
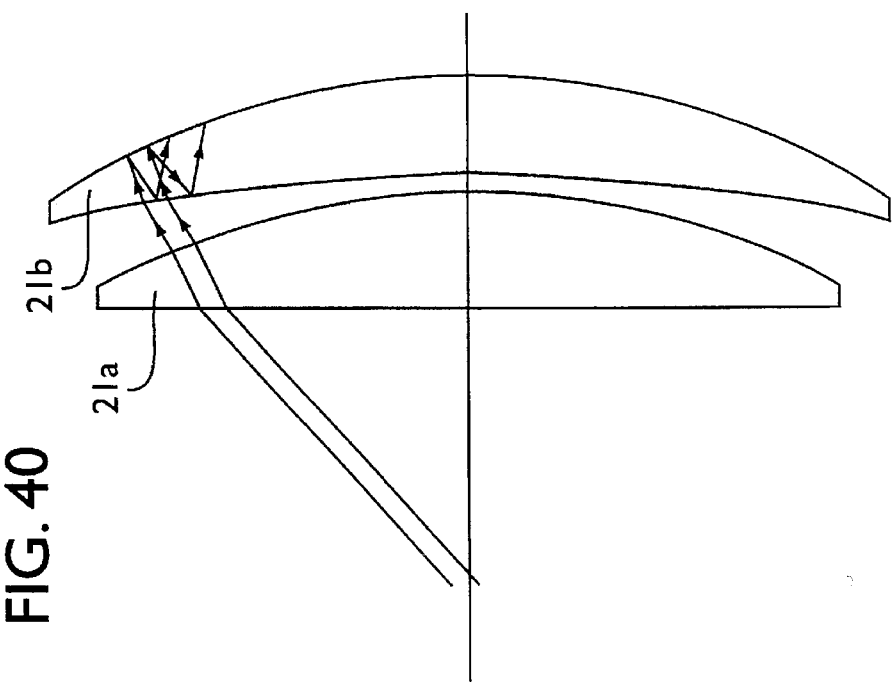
FIG. 40 is a partially enlarged view of the optical path illustrated in FIG. 39.
Figure 39:
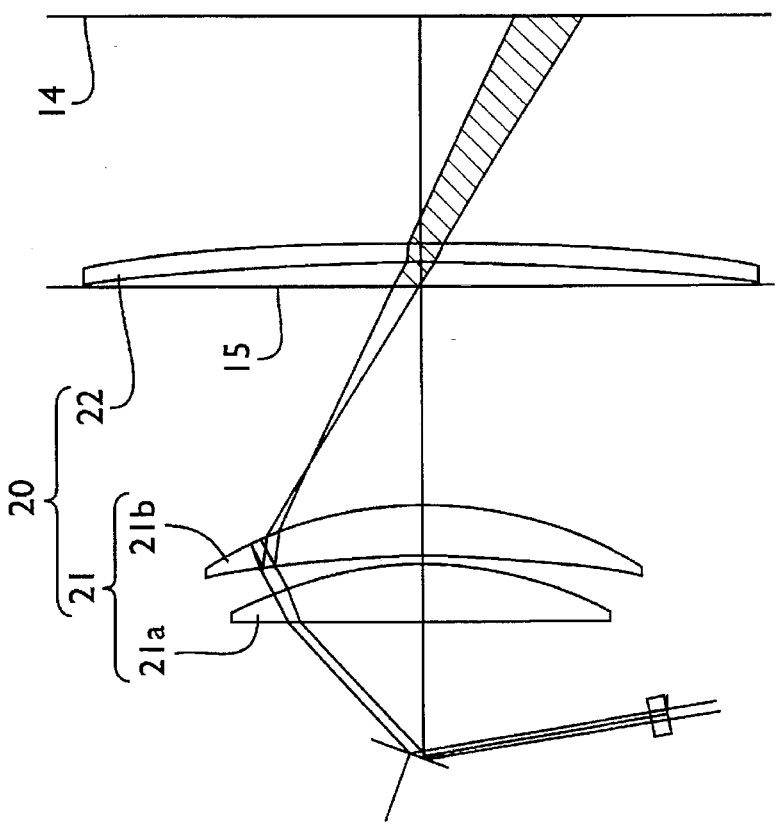
FIG. 39 is a plan view of an optical path of a light reflected on the second lens of the image forming lens group in the scanning optical system illustrated in FIG. 33.
Figure 41:
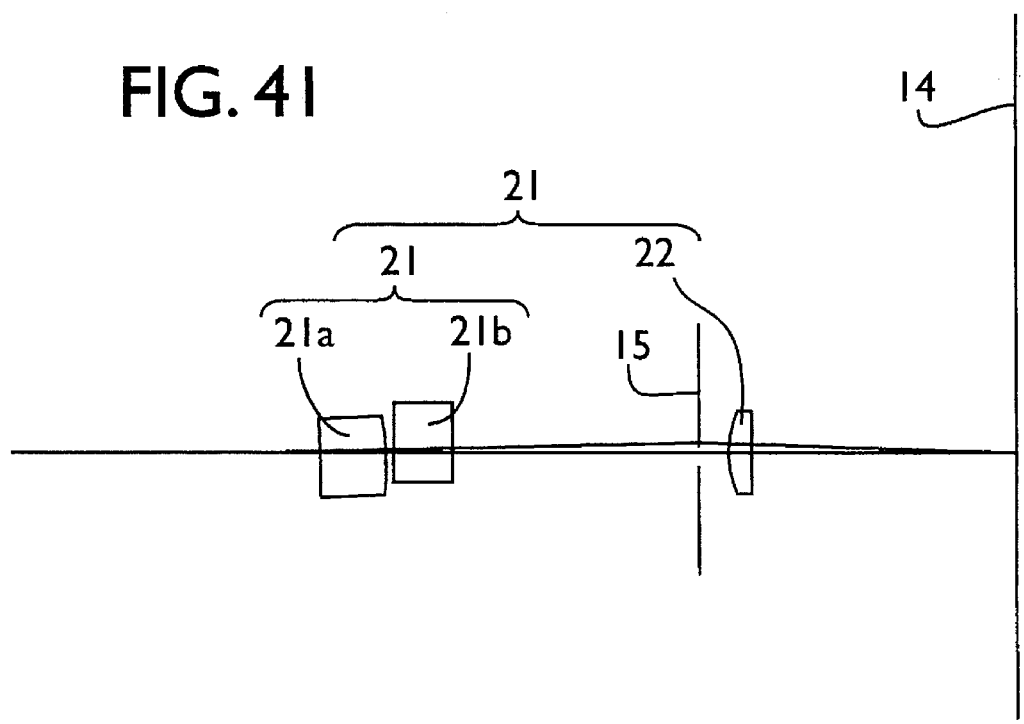
FIG. 41 is a front view of the optical path shown in FIG. 39.
Figure 42:
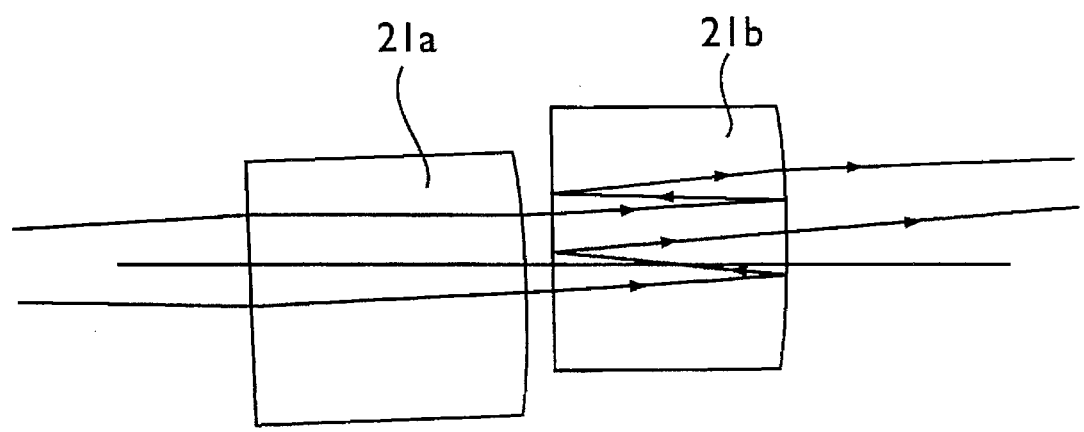
FIG. 42 is a partially enlarged view of the optical path shown in FIG. 41.

FIGS. 33 to 42 show the scanning optical system according to the eighth embodiment of the present invention, which comprises a scanning lens system 20 consisting of two lenses, the first lens 21a and the Second lens 21b, and a correction lens 22 like the configuration shown in FIG. 24. FIGS. 33 and 34 indicate the optical path of normal light; FIGS. 35 and 37 show the optical path of the light reflected on the internal surface of the first lens 21a; and FIGS. 39 and 41 the optical path of the light reflected on the internal surface of the second lens 21b. FIGS. 36 and 38 are partially enlarged views of the optical paths shown in FIGS. 35 and 37 respectively. Further, FIGS. 40 and 42 are partially enlarged views of the optical paths illustrated in FIGS. 39 and 41 respectively. Hatched portions in FIGS. 35, 37, 39 and 41 are portions in which the ghosting light has been interrupted. Table 9 shows the specification of the lens system.

TABLE 9

| f = 135.5 $F_{NO} = 50$ w = 45.67° surface No. | R | Rz | D | N |
|---|---|---|---|---|
|  |  |  | 37.00 |  |
| 1* | 2822.00 | 2822.00 | 15.60 | 1.48617 |
| 2 | −105.00 | −105.00 | 2.00 |  |
| 3 | −270.00 | 23.70 | 13.30 | 1.48617 |
| 4 | −107.00 | −107.00 | 63.00 |  |
| Slit |  |  | 1.50 |  |

TABLE 9-continued

| f = 135.5<br>$F_{NO} = 50$<br>w = 45.67°<br>surface No. | R | Rz | D | N |
|---|---|---|---|---|
| 5 | −711.00 | −711.00 | 5.0 | 1.48617 |
| 6 | −623.00 | −623.00 | 62.14 | |

*indicates aspherical surface.

Aspherical data;

$K=4.12, A4=-9.20\times10^{-8}, A6=2.77\times10^{-11}, A8=-3.16\times10^{-15}$

In this embodiment, the shift of the first lens 21a is −1.4 mm; the tilt of the first lens 21a is −1.2°; and the shift of the second lens 21b is 1.5 mm; the tilt of the second lens is 0°; the position and the width of an opening (slit) of the light interrupting member 15 is −0.1 mm and 1.8 mm respectively; and the diameter of normal light on the light interrupting member (in the sub-scanning cross-section) is 1.29 mm.

In this embodiment, the bow is 0.107 mm, which shows that the bow is effectively mitigated. No ghosting was observed on the scanning surface 14.

Tables 10 and 11 show the specification of the above lens system in accordance with reference symbols shown in FIG. 24. Both "$u_{00}$" and "$h_{00}$" are zero.

TABLE 10

First lens 21a

| Transmitting (normal) light | Light reflected on internal surface of first lens | Light reflected on internal surface of second lens |
|---|---|---|
| $f_{t1}$ ; 208.591 | $f_{r1}$ ; 32.270 | $f_{r1}$ ; 208.591 |
| $dat_1$ ; 2.338 | $dar_1$ ; 6.14 | $dat_1$ ; 2.338 |
| $dbt_1$ ; 7.423 | $dbr_1$ ; −11.768 | $dbt_1$ ; 7.423 |
| $e_{01}$ ; 16.815 | $e_{11}$ ; 36.006 | $e_{21}$ ; 11.324 |
| $S_1$ ; −1.4 | $S_1$ ; −1.4 | $S_1$ ; −1.4 |
| $\theta_1$ ; −1.2° | $\theta_1$ ; −1.2° | $\theta_1$ ; −1.2° |
| $u_{01}$ ; 6.946 × 10⁻³ | $u_{11}$ ; −4.737 × 10⁻² | $u_{21}$ ; 6.948 × 10⁻³ (rad.) |
| $h_{01}$ ; 0 | $h_{11}$ ; 0 | $h_{21}$ ; 0 |

TABLE 11

Second lens 21b

| Transmitting (normal) light | Light reflected on internal surface of first lens | Light reflected on internal surface of second lens |
|---|---|---|
| $f_{t2}$ ; 355.085 | $f_{t2}$ ; 355.085 | $f_{r2}$ ; 48.403 |
| $dat_2$ ; 7.788 | $dat_2$ ; 7.788 | $dat_2$ ; 2.297 |
| $dbt_2$ ; 12.372 | $dbt_2$ ; 12.372 | $dbt_2$ ; −11.746 |
| $e_{02}$ ; 57.278 | $e_{12}$ ; 57.278 | $e_{22}$ ; 81.396 |
| $S_2$ ; 1.5 | $S_2$ ; 1.5 | $S_2$ ; 1.5 |
| $\theta_2$ ; 0° | $\theta_2$ ; 0° | $\theta_2$ ; 0° |
| $u_{02}$ ; 2.094 × 10⁻³ | $u_{12}$ ; 3.940 × 10⁻² | $u_{22}$ ; −2.787 × 10⁻² (rad.) |
| $h_{02}$ ; −0.223 | $h_{12}$ ; −1.330 | $h_{22}$ ; −0.185 |

On the light interrupting member

| Transmitting (normal) light | Light reflected on internal surface of first lens | Light reflected on internal surface of second lens |
|---|---|---|
| $h_{03}$ ; −0.103 (−0.131) | $h_{13}$ ; −3.586 (−3.522) | $h_{23}$ ; 2.083 (1.973) |

The light interrupting member is situated 63 mm behind the lens 21.

Figures in parentheses are results of actual tracing of the light and show little difference from the calculated results described above.

Ninth Embodiment

Figure 43:
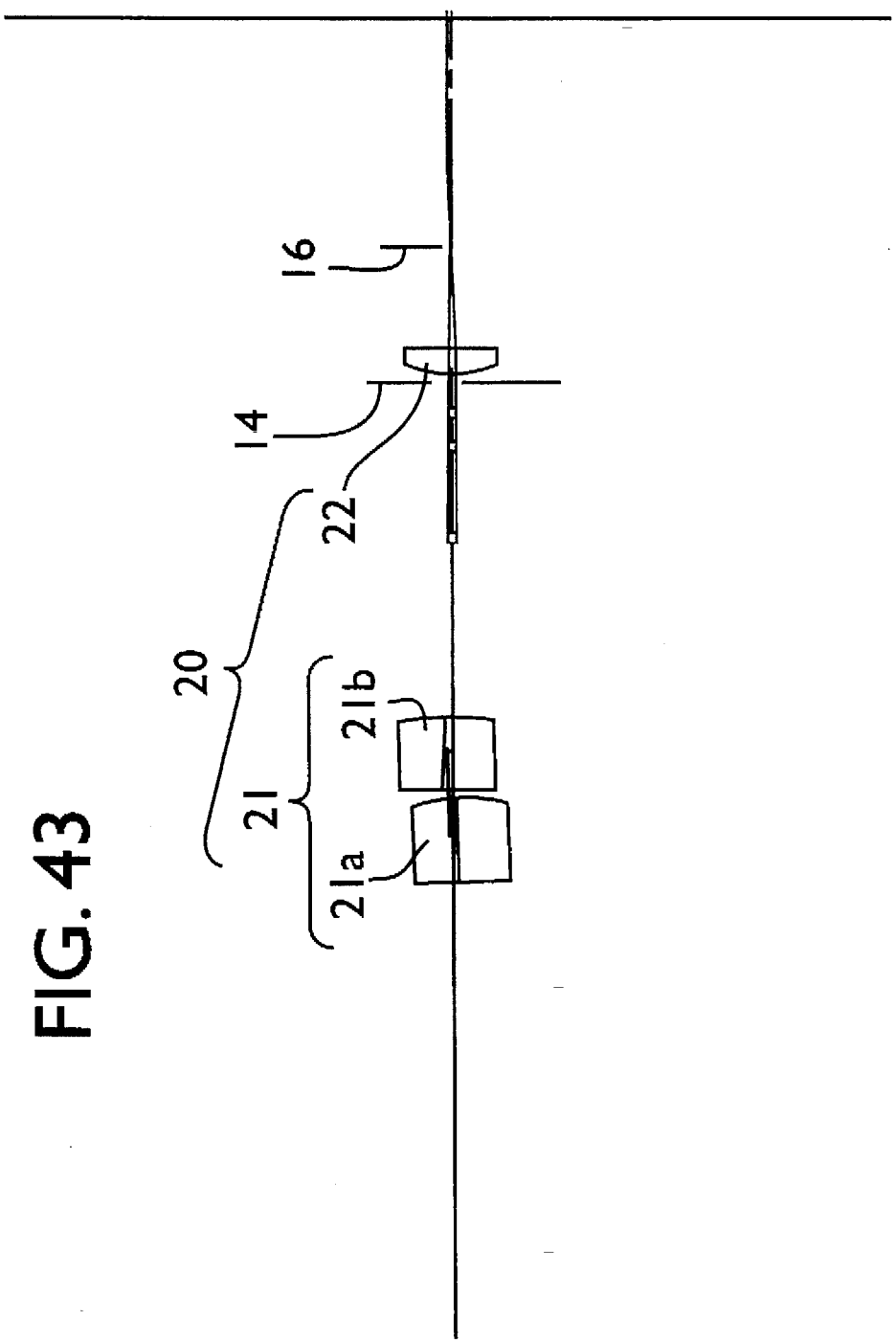
FIG. 43 is a front view of an optical path of a normal light in the scanning optical system shown in FIGS. 33 and 34 in which a correction lens is further shifted, and a light interrupting member is disposed between the correction lens and scanned surface.
Figure 44:
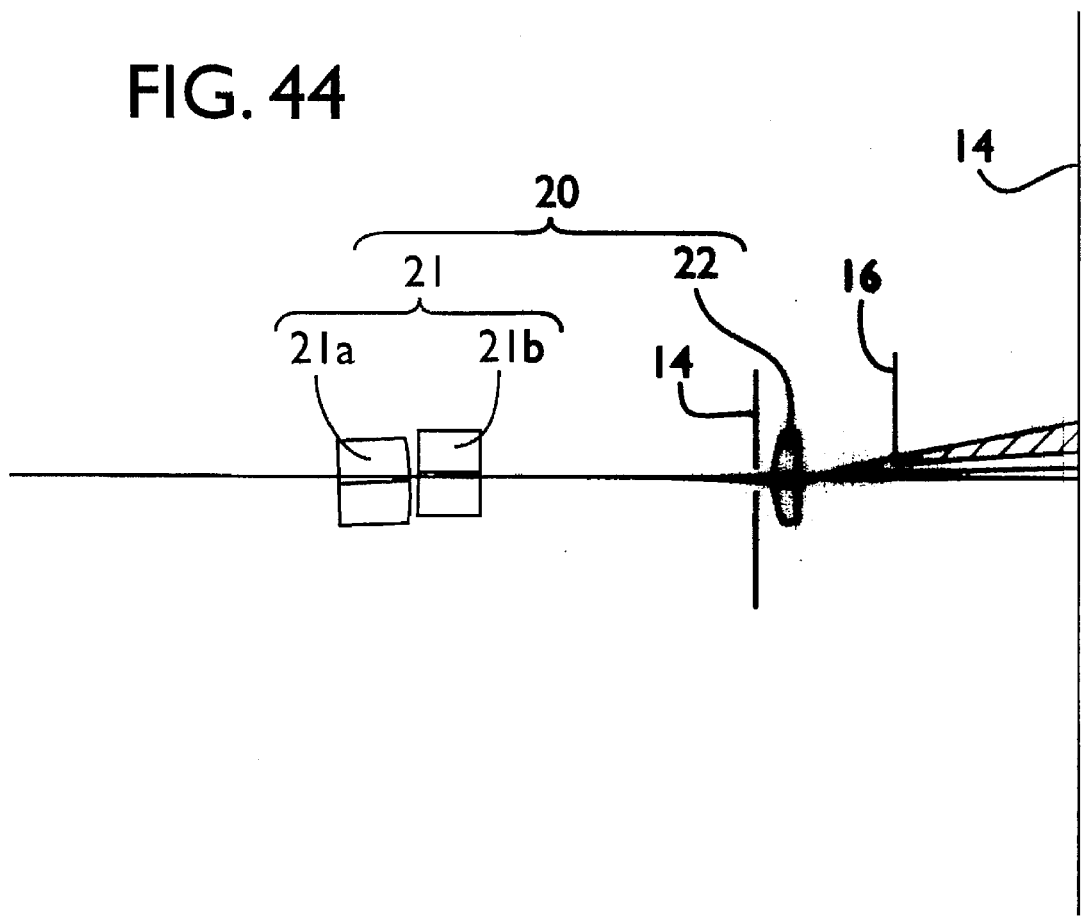
FIG. 44 is a front view showing the condition that a light reflected on the inner surface of the correction lens in FIG. 43 is interrupted by a light interrupting member.
Figure 45:
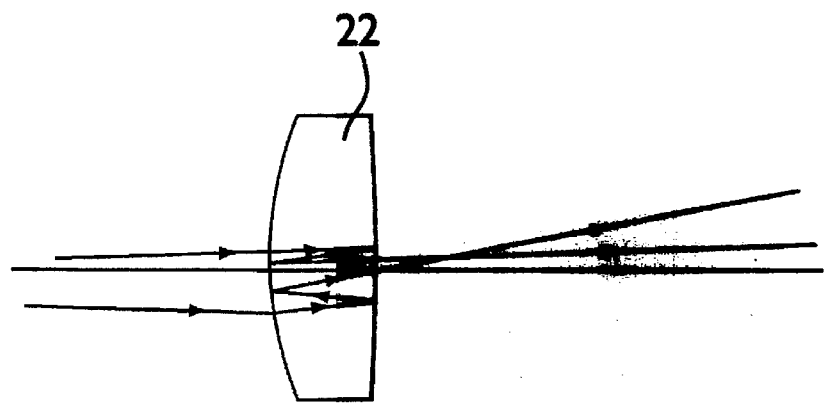
FIG. 45 is a partially enlarged view of the condition shown in FIG. 44.

A scanning optical system according to the ninth embodiment of the present invention will be explained. In this embodiment, the configuration of the lenses is the same as those of the eighth embodiment but the shift amount and tilt amount of the first and second lenses 21a, 21b are changed, and those values are shown in Table 12. FIGS. 43 and 44 indicate the lens system according to this embodiment, and FIG. 45 is a partially enlarged view of the lens system illustrated in FIG. 44. Further, the hatched portion in FIG. 44 is a portion where the ghost light has been interrupted.

TABLE 12

| Shift of first lens 21a; | −1.0 mm |
|---|---|
| Tilt of first lens 21a; | −1.0° |
| Shift of second lens 21b; | 1.0 mm |
| Tilt of second lens 21b; | 1.0° |
| Shift of correction lens; | 0.6 mm |

In this embodiment, the bow is 0.044 mm, indicating that the bow is effectively mitigated. No ghosting was observed on the scanning surface 14.

With the configuration of the scanning optical system according to the present invention in which at least one lens of the scanning optical system is shifted in the direction perpendicular to the optical axis, that is, with a simple configuration, even when the scanning optical system is made of plastic lenses without anti-reflection coating, the generation of ghost can be prevented. Further, proper positioning of the light interrupting member more effectively prevents the generation of ghosting. Further, the tilt of the lenses in addition to the shift thereof mitigates the bow caused by the shift of the lenses.

We claim:

1. A scanning optical system wherein a light beam deflected by an optical deflector is scanned on a scanning surface in a main scanning direction through said scanning optical system, comprising:

an image forming lens system having a refracting power at least in a direction of said main scanning direction;

an optical member having a plurality of deviated surfaces, each of said plurality of deviated surfaces having a center of radius of paraxial curvature deviated from a main scanning plane in a sub-scanning direction which is normal to said main scanning direction, said plurality of deviated surfaces being obtained by tilting each of said deviated surfaces about an axis parallel to said main scanning direction, a tilt direction of one of said deviated surfaces being provided such that a bow of said light beam caused by the tilt of another of said plurality of deviated surfaces is mitigated, said main scanning plane being defined by a plane in which said light beam is being scanned, said optical member having said deviated surfaces being a part of said image forming lens system; and a light interrupting member for interrupting a ghosting light reflected by at least one of external and internal surfaces including said one deviated surface in said image forming lens system, said light interrupting member being disposed between said image forming lens system and said scanning surface to prevent said ghosting light from reaching to said scanning surface.

2. The scanning optical system as claimed in claim 1, wherein at least one of said plurality of deviated surfaces has no anti-reflection coating.

3. The scanning optical system as claimed in claim 1, wherein said optical member having said plurality of deviated surfaces is made from plastic.

4. The scanning optical system as claimed in claim 3, wherein said deviated surfaces are provided when said member is molded.

5. The scanning optical system according to claim 1, wherein said optical member is tilted about said axis parallel to said main scanning direction, said axis being arranged to be located away from, in a direction of said scanning surface, a center point of said optical member.

6. The scanning optical system as claimed in claim 1, wherein said one of said plurality of deviated surfaces and said another of said plurality of deviated surfaces are provided on both sides of a plastic lens, said plurality of deviated surfaces being provided when said lens is molded.

7. The scanning optical system as claimed in claim 1, wherein the deviation of said one deviated surface of the optical member is further provided by shifting said surface in a sub-scanning direction which is normal to said main scanning plane.

8. The scanning optical system as claimed in claim 1, wherein said radius of curvature of said deviated surface is infinite.

9. A scanning optical system wherein a light beam deflected by an optical deflector is scanned on a scanning surface in a main scanning direction through said scanning optical system, comprising:

an image forming lens system having a refracting power at least in a direction of said main scanning direction;

an optical member having a plurality of deviated surfaces, each of said deviated surfaces having center of radius of paraxial curvature deviated from a main scanning plane in a sub-scanning direction which is normal to said main scanning direction, each of said deviated surfaces obtained by shifting said surface in said sub-scanning direction, a shift direction of one of said plurality of deviated surfaces being provided so that a bow of said scanned light caused by a shift of another of said plurality of surfaces is mitigated, said main scanning plane being defined by a plane in which said light beam is being scanned, said optical member having said deviated surfaces being a part of said image forming lens system; and a light interrupting member for interrupting a ghosting light reflected by at least one of external and internal surfaces including said one deviated surface in said image forming lens system, said light interrupting member being disposed between said image forming lens system and said scanning surface to prevent said ghosting light from reaching to said scanning surface.

10. The scanning optical system as claimed in claim 9, wherein said deviation of said one deviated surface is further given by tilting said surface about an axis parallel to said main scanning plane.

11. The scanning optical system as claimed in claim 9, wherein said optical member comprises two separate lenses and wherein said plurality of shifted surfaces are provided by shifting said two separate lenses.

12. The scanning optical system as claimed in claim 11, wherein said two separate lenses are shifted in the same direction.

13. The scanning optical system as claimed in claim 11, wherein said two separate lenses are shifted in directions different from each other.

14. A scanning optical system wherein a light beam deflected by an optical deflector is scanned on a scanning surface in a main scanning direction through said scanning optical system, a plane in which said light beam scanned being a main scanning plane; said scanning optical system comprising:

one image forming lens and one correction lens for correcting a deviation of the light beam from said main scanning plane which is caused by a tilt of a surface of said light deflector, said image forming lens being shifted in a sub-scanning direction which is normal to said main scanning direction; and a light interrupting member disposed between said image forming lens and said correction lens so as to prevent light reflected by a surface of said image forming lens from reaching said scanning surface.

15. The scanning optical system as claimed in claim 14, further comprising an additional light interrupting member which is disposed between said correction lens and said scanning surface.

16. The scanning optical system as claimed in claim 14, wherein said light interrupting member is positioned at a position in said scanning plane which satisfies the following relationship:

$$|h_{o1} - h_{o2}| > \phi$$

wherein $h_{o1}$ represents a height of said reflected light on an internal surface of said second lens of the image from the optical axis from said forming lens, $h_{o2}$ represents a height of normal light from the optical axis when emitted from said image forming lens, $\phi$ represents a diameter of the normal light in the sub-scanning direction.

17. The scanning optical system as claimed in claim 14, wherein said correction lens is shifted to prevent light reflected on an internal surface of said correction lens from reaching said scanning surface, and an additional light interrupting member is disposed between said correction lens and said scanning surface.

18. A scanning optical system wherein a light beam deflected by an optical deflector is scanned on a scanning surface in a main scanning direction through said scanning optical system, comprising:

an image forming lens group consisting of first and second lenses, in order from said deflector to said scanning surface, at least one of said first and second lenses being shifted in a direction perpendicular to an optical axis in a sub-scanning direction which is normal to said main scanning direction;

a correction lens for correcting a deviation of said light beam from the standard optical axis which is caused by a tilt of a surface of said light deflector, said correction lens being distinct from said image forming lens group; and a light interrupting member disposed between said image forming lens system and said scanning surface so as to prevent light reflected on a surface in said image forming lens group from reaching said scanning surface.

19. The scanning optical system as claimed in claim 18, wherein said light interrupting member is positioned at a position along said optical axis which satisfies the following relationships:

$$|h_{13} - h_{03}| > \phi$$

$$|h_{23} - h_{03}| > \phi$$

wherein;

$h_{13}$ represents a height of light reflected on an internal surface of said first lens of the image forming group from the optical axis when emitted from the first lens, $h_{23}$ represents a height of light reflected on an internal surface of said second lens of the image forming group when emitted from the second lens, $h_{03}$ represents a height of normal light of said second lens of said image forming lens group from the optical axis when emitted from the second lens, $\phi$ represents a diameter of the normal light in the sub-scanning direction.

20. The scanning optical system as claimed in claim 19, wherein said correction lens is shifted to prevent light reflected on an internal surface of said correction lens from reaching said scanning surface, and an additional light interrupting member is disposed between said correction lens and said scanning surface.

21. The scanning optical system as claimed in claim 19, wherein said lens shifted in said direction perpendicular to said optical axis comprises a plastic lens, said plastic lens having a gate portion formed at a circumference of said lens when said lens is molded; and said lens is shifted in a direction such that said gate is moved away from said optical axis.

22. A scanning optical system wherein light beams deflected by an optical deflector are scanned on a scanning surface in a main scanning direction through said scanning optical system, comprising:

an image forming lens system having a refracting power in at least a direction of said main scanning direction, said image forming lens system comprising an optical member having a plurality of surfaces, wherein at least one of said surfaces of said optical member is arranged to be deviated such that said light beams causing ghosting light are reflected away from a main scanning surface, and at least another surface of said optical member being deviated to eliminate a bow of said scanned light beams caused by a deviation of said at least one of said surfaces; and a light interrupting member for interrupting ghosting light, said light interrupting member being disposed between said image forming lens system and said scanning surface to prevent said ghosting light from being incident on said scanning surface.

23. The scanning optical system according to claim 22, wherein said at least one of said surfaces is deviated by tilting said at least one of said surfaces about an axis parallel to said main scanning direction.

24. The scanning optical system according to claim 23, wherein said at least another of said surfaces is deviated by tilting in accordance with said deviation of said at least one of said surfaces.

25. The scanning optical system according to claim 22, wherein said at least one of said surfaces is deviated by shifting said at least one of said surfaces in a sub-scanning direction which is normal to said main scanning direction.

26. The scanning optical system according to claim 25, wherein said at least another of said surfaces is deviated by shifting in accordance with said deviation of said at least one of said surfaces.

27. The scanning optical system as claimed in claim 22, further comprising an additional light interrupting member which is disposed between said optical member and said scanning surface.

28. A scanning optical system wherein a light beam deflected by an optical deflector is scanned on a scanning surface in a main scanning direction through said scanning optical system, comprising:

an image forming lens system having a refracting power at least in a direction of said main scanning direction;

an optical member having at least one deviated surface having a center of radius of paraxial curvature deviated from a main scanning plane in a sub-scanning direction which is normal to said main scanning direction, said main scanning plane being defined by a plane in which said light beam being scanned, said optical member having said deviated surface being a part of said image forming lens system;

a correction lens for correcting a deviation of said light beam in said main scanning direction beam caused by a tilt of said optical deflector; and a light interrupting member for interrupting ghosting light reflected by at least one of external and internal surfaces including said deviated surface in said image forming lens system, said light interrupting member being disposed between said image forming lens system and said correction lens to prevent said ghosting light from reaching to said scanning surface.

29. The scanning optical system according to claim 28, further comprising an additional light interrupting member, said additional light interrupting member disposed between said correcting lens and said scanning surface.

30. A scanning optical system wherein light beams deflected by an optical deflector are scanned on a scanning surface in a main scanning direction through said scanning optical system, comprising:

an image forming lens system having a refracting power in at least a direction of said main scanning direction, said image forming lens system comprising an optical member having a plurality of surfaces, wherein at least one of said surfaces of said optical member is arranged to be deviated such that said light beams cause a ghost away from a main scanning surface, and at least another surface of said optical member being deviated to eliminate a bow of said scanned light beams caused by a deviation of said at least one of said surfaces.

31. The scanning optical system according to claim 30, further comprising a light interrupting member for interrupting ghosting light, said light interrupting member being disposed between said image forming lens system and said scanning surface to prevent said ghosting light from being incident on said scanning surface.

32. The scanning optical system according to claim 30, wherein said at least one of said surfaces is deviated by tilting said at least one of said surfaces about an axis parallel to said main scanning direction.

33. The scanning optical system according to claim 32, wherein said at least another of said surfaces is deviated by tilting in accordance with said deviation of said at least one of said surfaces.

34. The scanning optical system according to claim 30, wherein said at least one of said surfaces is deviated by shifting said at least one of said surfaces in a sub-scanning direction which is normal to said main scanning direction.

35. The scanning optical system according to claim 34, wherein said at least another of said surfaces is deviated by shifting in accordance with said deviation of said at least one of said surfaces.

* * * * *

UNITED STATES PATENT AND TRADEMARK OFFICE
CERTIFICATE OF CORRECTION

PATENT NO. : 5,646,767
DATED : July 8, 1997
INVENTOR(S) : M. IIMA et al.

It is certified that error appears in the above-indentified patent and that said Letters Patent is hereby corrected as shown below:

At column 18, line 33 (claim 16, line 3) of the printed patent, before "scanning" insert ---main---.

Signed and Sealed this

Eighteenth Day of August, 1998

Attest:

BRUCE LEHMAN

Attesting Officer      Commissioner of Patents and Trademarks